March 2, 1943.     J. D. BAUM     2,312,378
ARCH SUPPORT
Filed May 23, 1940     11 Sheets-Sheet 1
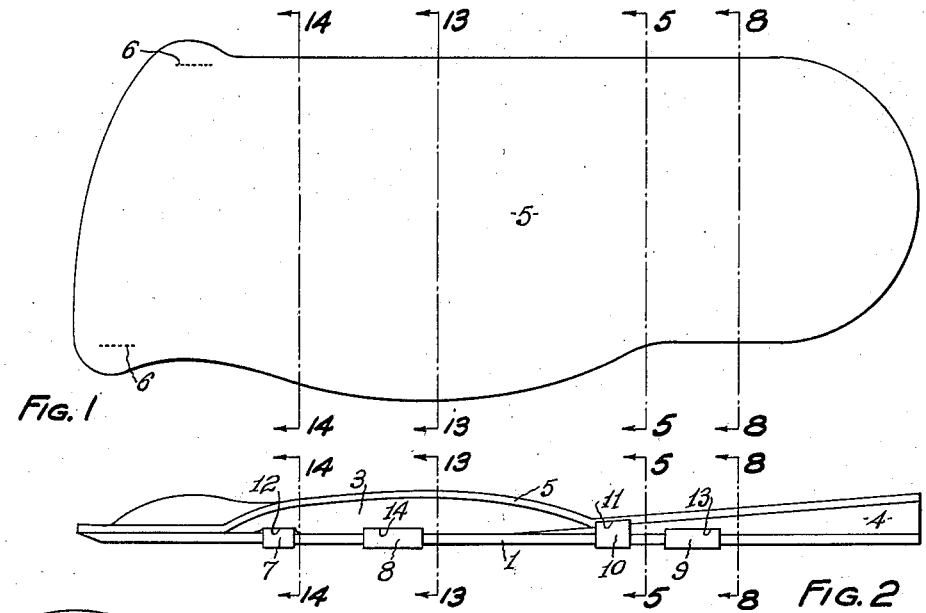
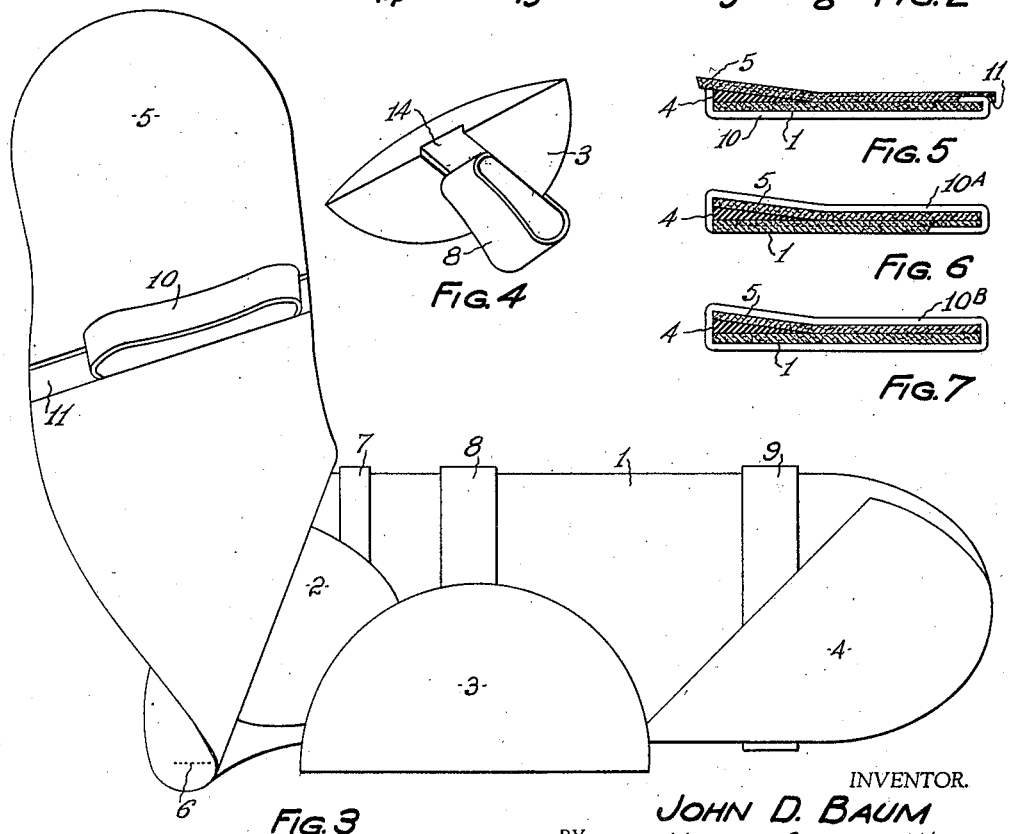
INVENTOR.
JOHN D. BAUM
BY Harry P. Canfield
ATTORNEY.

March 2, 1943.  J. D. BAUM  2,312,378
ARCH SUPPORT
Filed May 23, 1940   11 Sheets-Sheet 2

INVENTOR.
JOHN D. BAUM
BY  Harry P. Canfield
ATTORNEY.

March 2, 1943.  J. D. BAUM  2,312,378
ARCH SUPPORT
Filed May 23, 1940  11 Sheets-Sheet 3
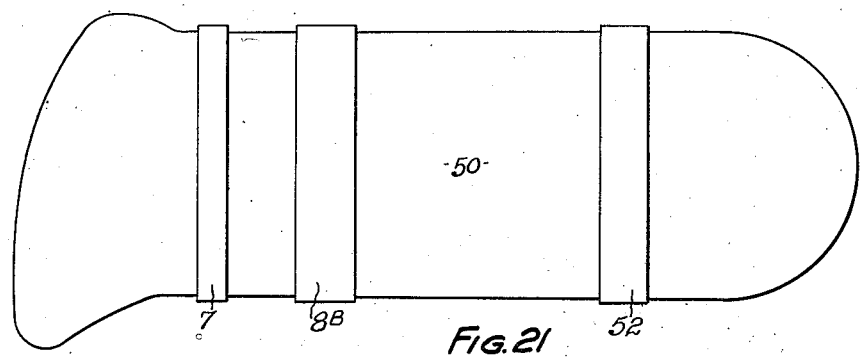
FIG.21
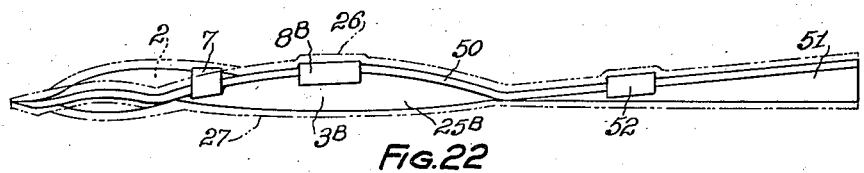
FIG.22
FIG.23
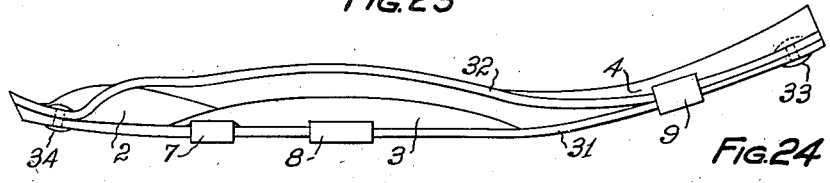
FIG.24
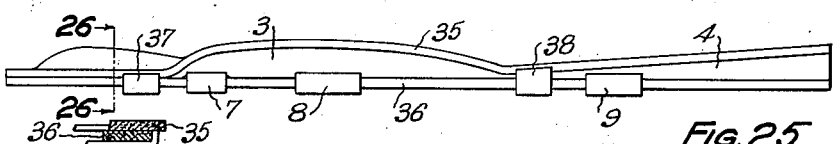
FIG.25
FIG.26
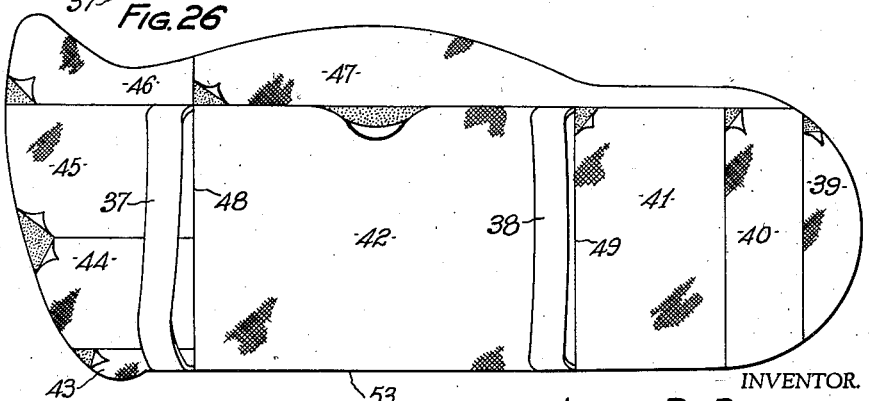
FIG.27
INVENTOR.
JOHN D. BAUM
BY Harry P. Canfield
ATTORNEY.

March 2, 1943. J. D. BAUM 2,312,378
ARCH SUPPORT
Filed May 23, 1940 11 Sheets-Sheet 4
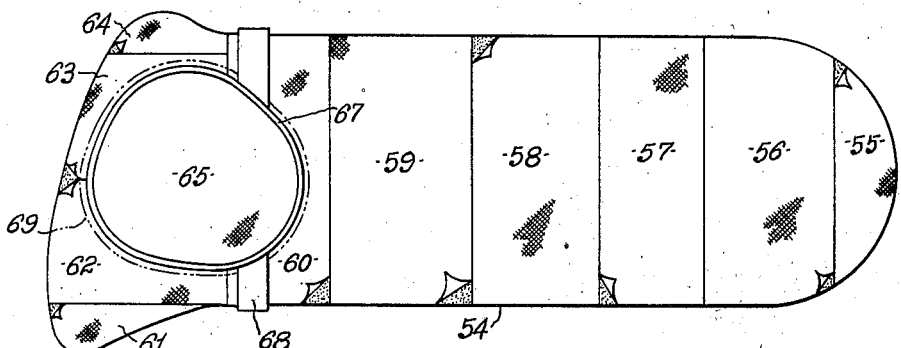
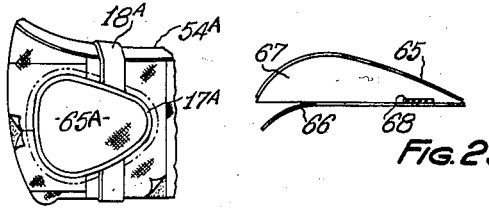
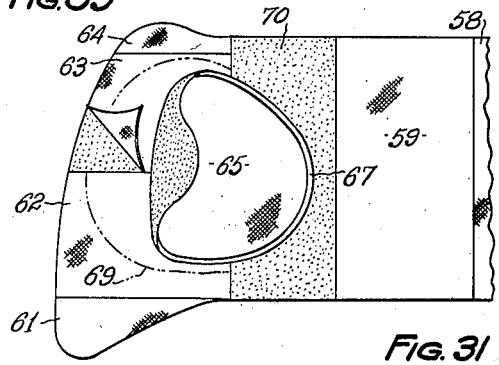
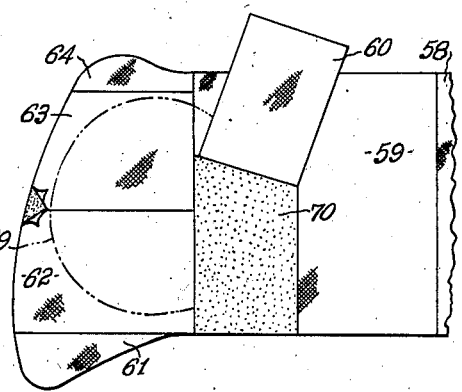
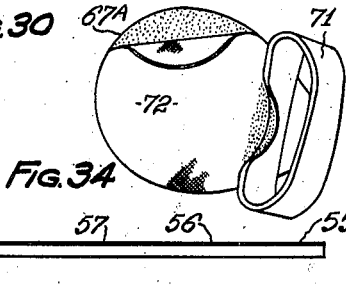
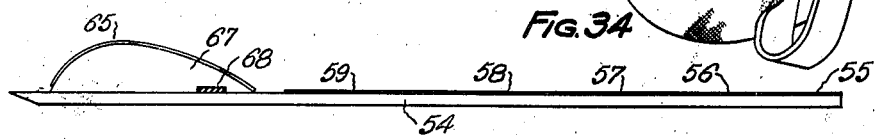
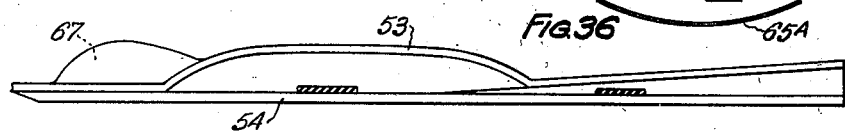
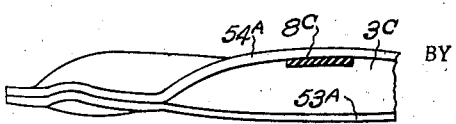
INVENTOR.
JOHN D. BAUM
BY Harry P. Canfield
ATTORNEY.

March 2, 1943.  J. D. BAUM  2,312,378
ARCH SUPPORT
Filed May 23, 1940  11 Sheets-Sheet 5

INVENTOR.
JOHN D. BAUM
BY Harry A. Canfield
ATTORNEY.

March 2, 1943. J. D. BAUM 2,312,378
ARCH SUPPORT
Filed May 23, 1940 11 Sheets-Sheet 6
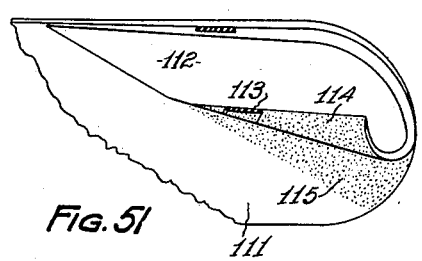
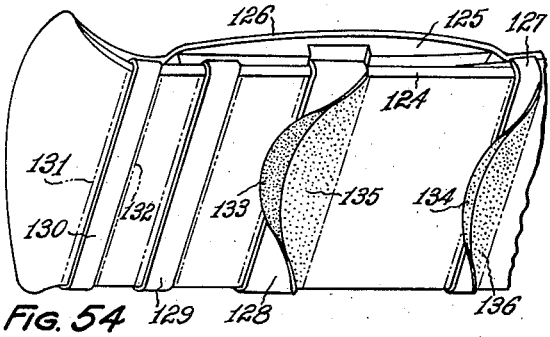
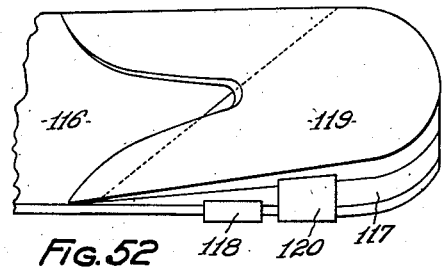
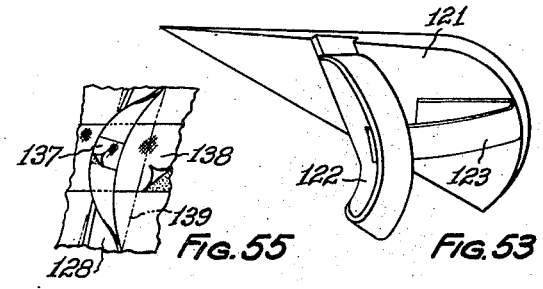
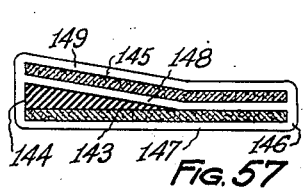
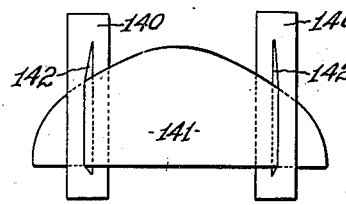
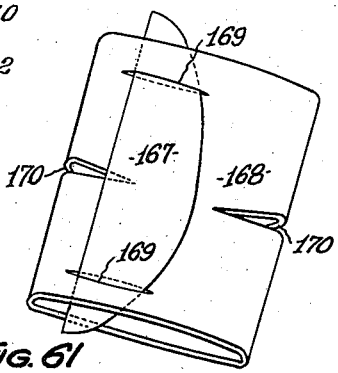
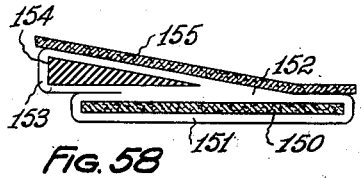
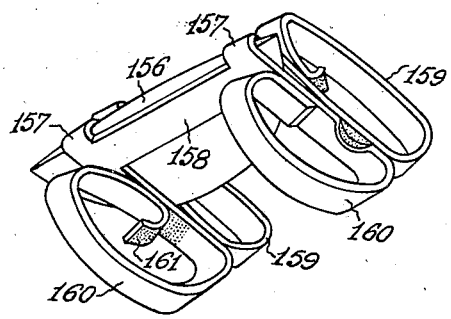
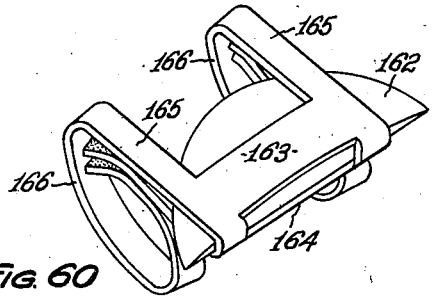
INVENTOR.
JOHN D. BAUM
BY Harry P. Canfield
ATTORNEY.

March 2, 1943.  J. D. BAUM  2,312,378
ARCH SUPPORT
Filed May 23, 1940  11 Sheets-Sheet 7

INVENTOR.
JOHN D. BAUM
BY Harry P. Canfield
ATTORNEY.

March 2, 1943.    J. D. BAUM    2,312,378
ARCH SUPPORT
Filed May 23, 1940    11 Sheets-Sheet 8
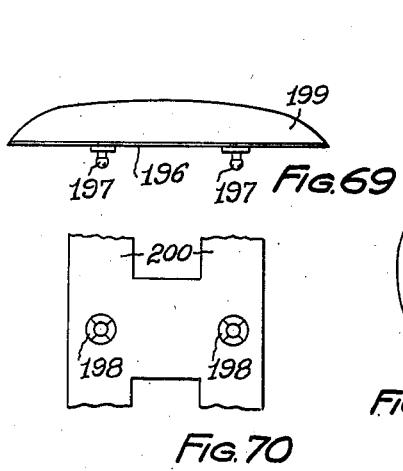
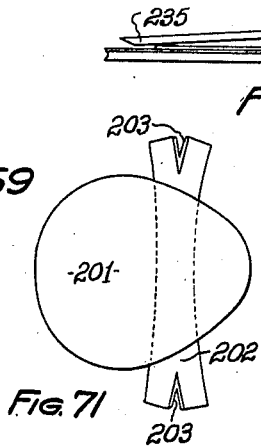
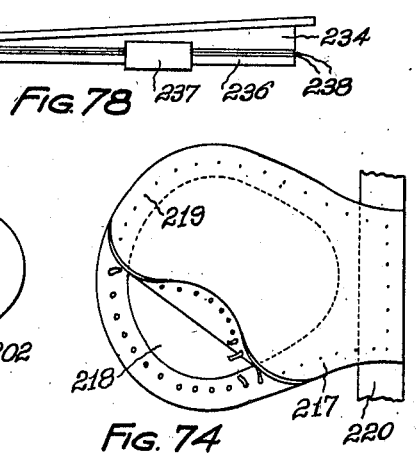
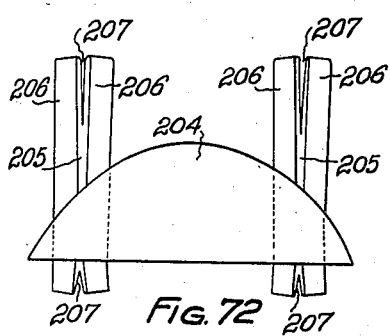
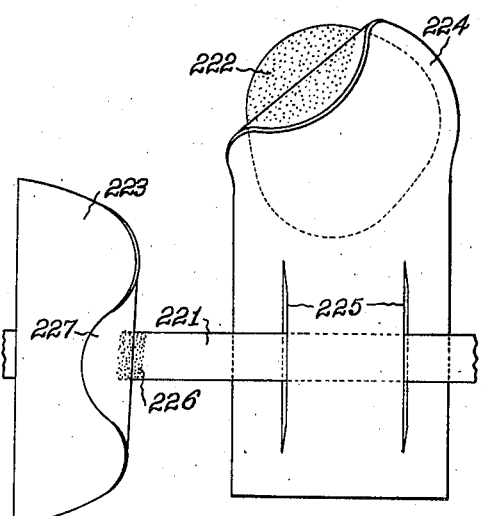
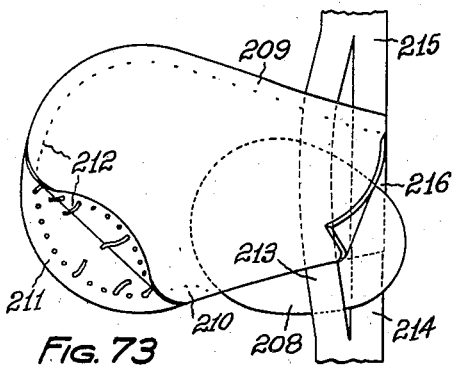
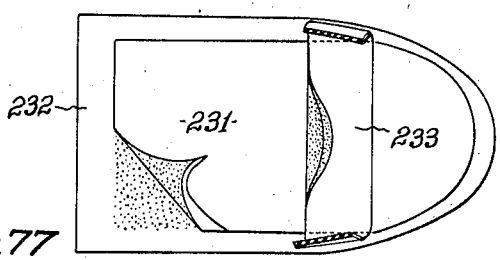
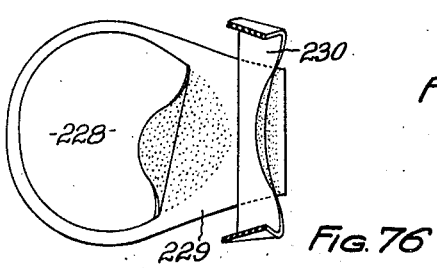
INVENTOR.
JOHN D. BAUM
BY Harry R. Canfield
ATTORNEY.

March 2, 1943. J. D. BAUM 2,312,378
ARCH SUPPORT
Filed May 23, 1940 11 Sheets-Sheet 9
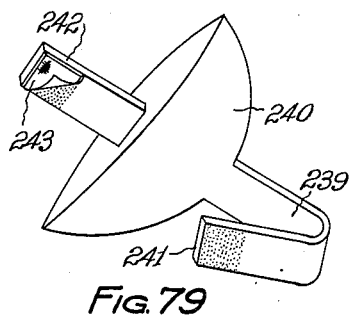
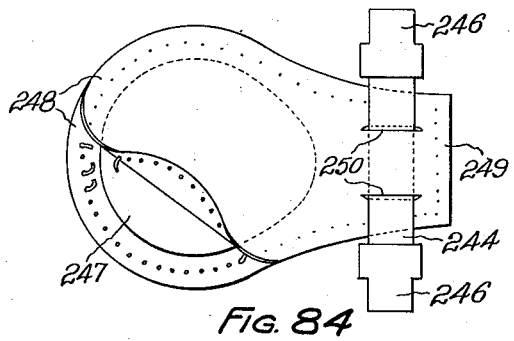
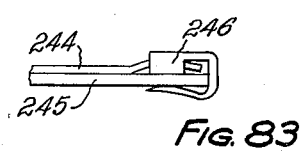
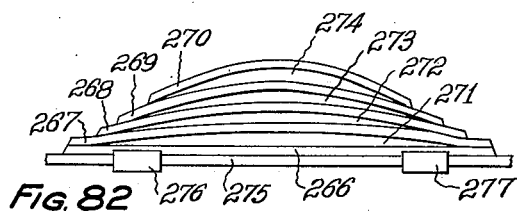
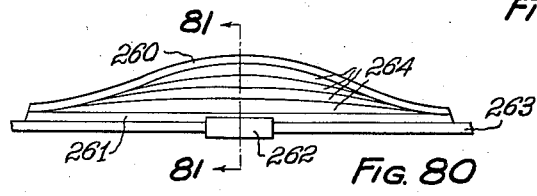
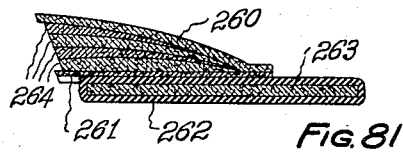
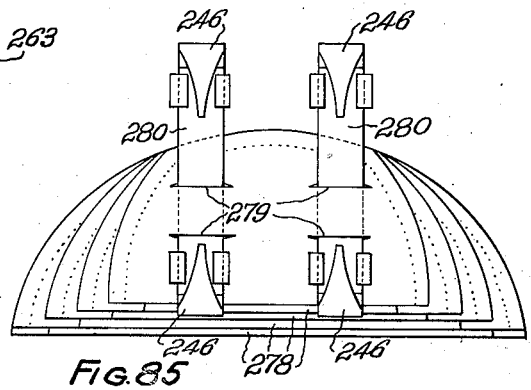
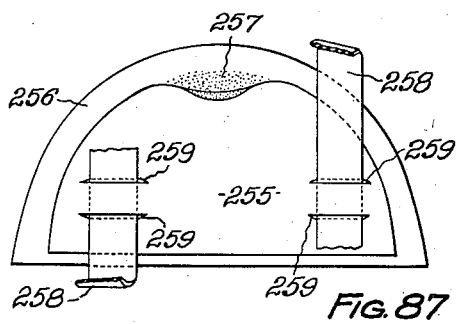
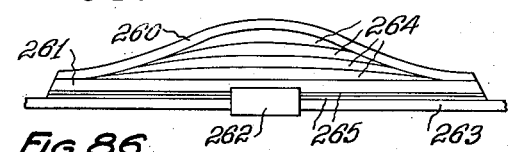
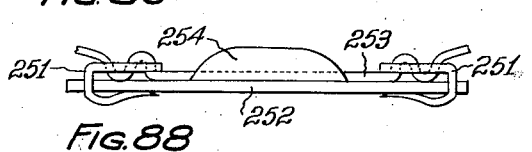
INVENTOR.
JOHN D. BAUM
BY Harry R. Canfield
ATTORNEY.

March 2, 1943. J. D. BAUM 2,312,378
ARCH SUPPORT
Filed May 23, 1940 11 Sheets-Sheet 10
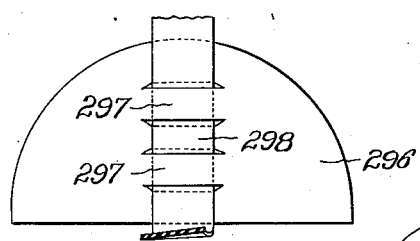
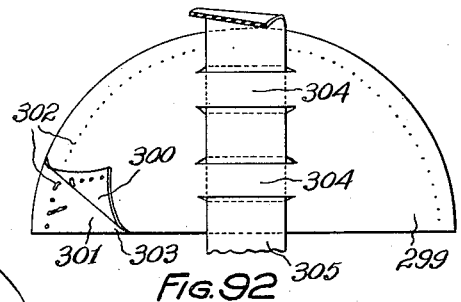
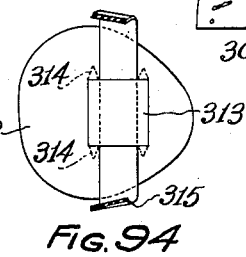
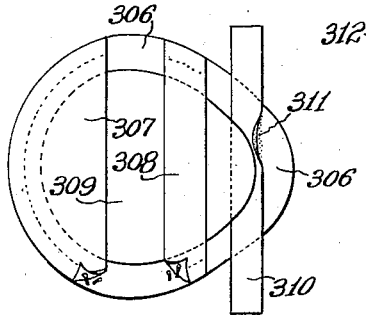
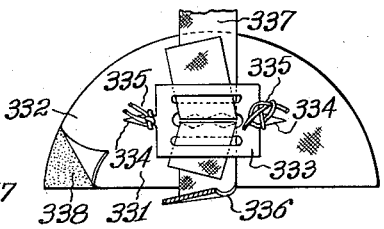
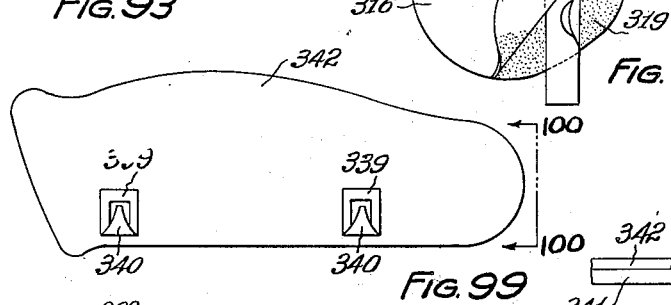
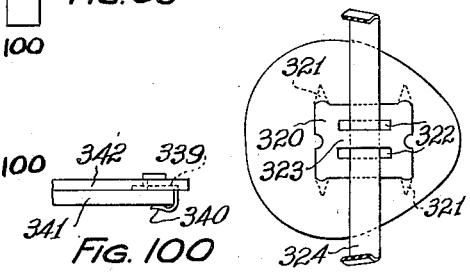
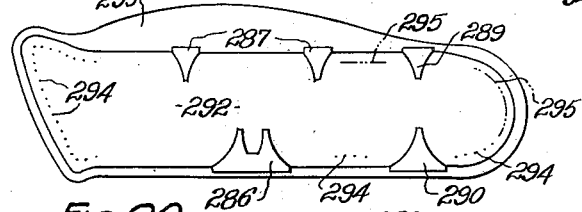
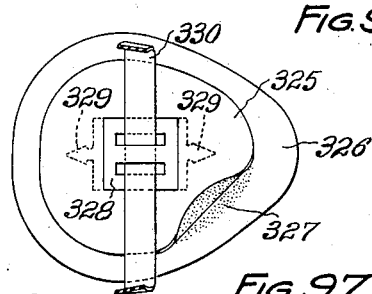
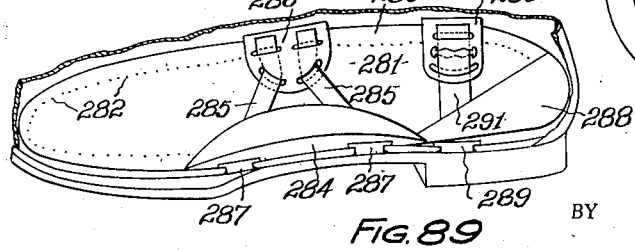
INVENTOR.
JOHN D. BAUM
BY Harry P. Canfield
ATTORNEY.

March 2, 1943.　　　J. D. BAUM　　　2,312,378
ARCH SUPPORT
Filed May 23, 1940　　　11 Sheets-Sheet 11

INVENTOR.
JOHN D. BAUM
BY
ATTORNEY.

Patented Mar. 2, 1943

2,312,378

UNITED STATES PATENT OFFICE 2,312,378

ARCH SUPPORT

John D. Baum, Parma, Ohio

Application May 23, 1940, Serial No. 336,730

40 Claims. (Cl. 36—71)

This invention relates to devices to be worn in shoes to support the feet, such devices being commonly known as arch supports, and relates more particularly to arch supports that are adjustable.

Arch supports comprise in general a device that can be inserted in the wearer's shoe, or built into the shoe, having pads or other elevated portions upon which the bones of the feet rest to cause the bones to take up or approach their normal positions, and to give comfort and to support and correct broken or fallen arches, flat feet, etc., whether congenital or otherwise.

A known type of such arch support comprises a rigid base or insole portion with pad like elevations formed thereon; and another type comprises a base or the like having a pocket or pockets into which pads may be inserted; but in all such devices of which I am aware, the pads or other elevated portions have in general a fixed position, so that to change the point of support of the arch, other pads of different shape must be substituted, or if the device is relatively rigid, it must be changed in form; so that it is difficult or impossible to fit a support precisely to the optimum requirements of an individual case.

According to the present invention, provision is made by which the supporting pads or elevated portions of the device are universally adjustable, that is to say, they may be adjusted transversely or longitudinally of the foot by any desired increment of change, large or small, to adapt them precisely to the individual foot being treated; and when the optimum positions thereof have been ascertained by trial, both as to comfort and as to corrective effect, they may be fixed in that position against accidental displacement, but at the same time in such manner that they can be removed and other pads substituted therefor; and this universal adjustability and detachability is provided for pads or supporting portions at all points of the foot to be supported; and provision is made by which these features may be incorporated in a separate device in the general nature of an insole or arch support to be worn in a shoe and transferred from one shoe to another, or built into and as a permanent part of the shoe itself. A base to carry the pads and a cover for the pads are provided and when the aforesaid optimum positions of the pads have been attained the pads, cover and base may all be relatively immovably secured together in a unitary arch support.

It is therefore among the objects of my invention:

To provide generally an improved construction of arch support of the class referred to;

To provide generally an improved construction of arch support pad;

To provide an improved construction of arch support device comprising one or more pads or elevated portions which may be adjusted in an improved manner in the device;

To provide in connection with an arch support, an improved method for adjustably fitting or adapting the support and the pads or elevated portions thereof to an individual case;

To provide an improved arch support in which the pads or elevated portions may be adjusted universally, longitudinally and transversely, and subsequently fixed in their optimum positions;

To provide an improved construction of arch support adaptable to be embodied in the insole type of arch support or to be optionally built into a shoe;

To provide an improved construction of arch support and method of operation by which individual supporting pads or the like may be adjusted in position or interchanged with other pads by trial fittings on a base or the like, until the optimum corrective positions for the pads have been ascertained and then secured in that position against accidental displacement to constitute a unitary arch support;

To provide an adjustable arch support provided with means whereby it may function as an arch support fitting device;

To provide an arch support having adjustable pads or elevated portions, and provided with means for recording trials of different pads and positions thereof whereby the effect of the pads may be analyzed and the optimum positions and sizes and shapes of the pads determined, and a record made and preserved of the fitting trials and of the optimum end result.

Other objects will be apparent to those skilled in the art to which my invention appertains.

My invention is fully disclosed in the following description taken in connection with the accompanying drawings, in which:

Fig. 1 is a top plan view on an arch support embodying my invention in one form, and comprising a base, a cover, an adjustable metatarsal, longitudinal and heel pads;

Fig. 2 is a side elevational view of the arch support of Fig. 1;

Fig. 3 is a view of the arch support of Fig. 1 with the cover portion thereof hinged upwardly to disclose the underlying pads and showing a means of attaching the cover portion to the base thereof;

Fig. 4 is a perspective view taken from below of a longitudinal pad viewed from above in Fig. 3, and from the side in Fig. 2, and illustrating in one form an attaching band element of the pad which I may employ;

Fig. 5 is a cross-sectional view taken from the plane 5—5 of Figs. 1 and 2;

Figs. 6 and 7 are views similar to Fig. 5, but illustrating modifications;

Fig. 21 is a view similar to Fig. 1, illustrating a modification of arch support in which the pads are under the base instead of above it, as in Fig. 1;

Fig. 22 is a side elevational view of the arch support of Fig. 21;

Figs. 23, 24, 25 are views similar to Fig. 22 illustrating modifications;

Fig. 26 is a fragmentary sectional view taken from the plane 26—26 of Fig. 25;

Fig. 27 is a view illustrating the underside of a cover element; and Fig. 28 is a view illustrating the upperside of a base element; these views illustrating the use of face cloth or similar sheet material or other material and an adhesive which I may employ in the practice of my invention to secure the cover and base and pads together after the pads have been adjustably positioned;

Figs. 29, 30, 31, 32 and 33 illustrate steps of process of securing a pad in position in an arch construction after its position has been adjustably determined;

Figs. 34 and 35 are views illustrating modifications of the said steps of process;

Fig. 36 is a side view with parts broken away of a part of Fig. 35;

Fig. 37 is a fragmentary side view of an arch support embodying a pad mounted therein by the process indicated in Figs. 35 and 36;

Fig. 38 is a perspective view illustrating an arch support embodying certain features of my invention built in and made a part of a shoe;

Fig. 39 is a view similar to Fig. 38, illustrating a modification;

Fig. 40 is a view illustrating a modification of the means for attaching the arch support in the shoe of Fig. 38 or Fig. 39;

Figs. 41 and 42 illustrate a modification of means for attaching together a cover element and a base element of an arch support embodying my invention;

Figs. 43 and 44 are views similar to Fig. 41 illustrating modifications;

Fig. 45 is a view generally similar to Figs. 38 and 39, but illustrating an arch support embodying my invention built into a shoe at the rearward end instead of at the forward end as in Figs. 38 and 39;

Figs. 46, 47, 48, 49 and 50 are views similar to Fig. 45 illustrating modifications;

Figure 8:
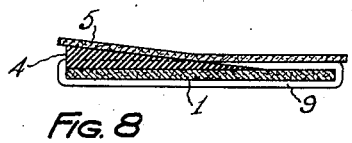
Fig. 8 is a cross-sectional view taken from the plane 8—8 of Figs. 1 and 2.
Figure 10:
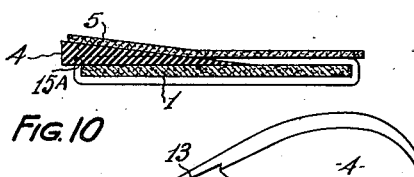
Figure 101:
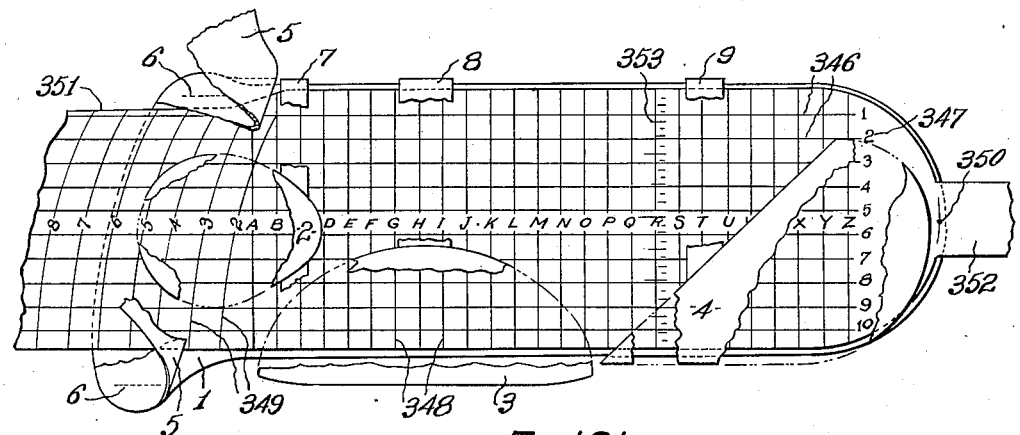
Figure 102:
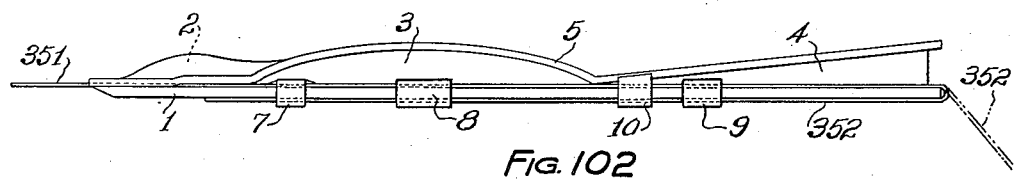
Figure 103:
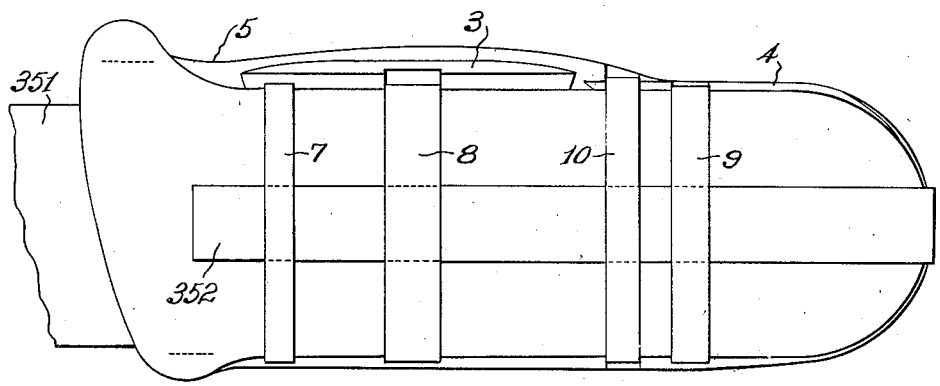

Figs. 51 to 56, inclusive, and Figs. 59 to 61, inclusive, illustrate modifications of means for mounting pads into the structure of an arch support embodying my invention;

Fig. 57 is a view similar to Fig. 8, illustrating a modification;

Fig. 58 is a view similar to Fig. 10, illustrating a modification;

Figs. 62 to 68, inclusive, are views illustrating modifications of a band means which I may employ for fastening covers and pads to a base, or the like, of the arch support;

Figs. 69 and 70 are views illustrating means for attaching pads with face cloth or other material to bands for attachment to the main structure of an arch support embodying my invention;

Figs. 71 and 72 are views illustrating modifications of a band element which I may employ for adjustably mounting a pad upon the structure of the arch support;

Figs. 73 and 74 are views illustrating modifications of certain principles of my invention and showing a pad mounted upon another piece and the said other piece being adjustable in the arch support;

Fig. 75 is a view illustrating a modification in which two pads may be held in the arch support adjustably, by a single attaching means;

Fig. 76 is a view similar to Figs. 73 and 74 illustrating another modification;

Fig. 77 is a view illustrating a modification in which a pad is assembled unitarily with a cover therefor;

Fig. 78 is a side view of a structure similar to that of Fig. 77 illustrating a modification;

Fig. 79 is a view illustrating a modification of a pad and a band thereof which I may employ;

Fig. 80 is a view illustrating means by which the thickness of the pad may be adjustably varied;

Fig. 81 is a view taken from the plane 81—81 of Fig. 80;

Fig. 82 is a view similar to Fig. 80 illustrating a modification;

Fig. 83 is a view illustrating a modification of means for attaching a band element to a base or the like;

Fig. 84 is a view similar to Fig. 74 illustrating a modification;

Figs. 85 and 86 are views similar to Fig. 80 illustrating modifications;

Fig. 87 is a view similar to Fig. 77 illustrating a modification;

Fig. 88 is a view similar to Fig. 83 illustrating a modification;

Fig. 89 is a view similar to Figs. 38 and 39, illustrating a modification;

Fig. 90 is a view illustrating a modified means of securing pads to a base or the like;

Figs. 91 and 92 are views illustrating modified means for adjusting the position of a pad;

Fig. 93 is a view similar to Fig. 73 illustrating a modification;

Figs. 94, 95, 96, 97 and 98 are views illustrating modifications of means for adjustably attaching pads to a base or the like;

Figs. 99 and 100 are views illustrating modifications of means for attaching a cover element to a base element;

Figs. 101, 102 and 103 illustrate a fitting device, to the use of which an arch support embodying my invention is adapted; and by which the required pads for an individual case may be indicated; and by which a record of adjustments of the pads from time to time may be made; Fig. 101 being a top plan view; and Fig. 102 being a side elevational view of the parts of Fig. 101; and Fig. 103 being a bottom plan view of the parts of Fig. 101.

While in the drawings I have illustrated my invention in numerous forms and modifications including forms of the removable insole type of arch support, and forms built into a shoe, all of these forms and modifications embody the underlying principles of my invention which include: the mounting of a pad of any desired shape, size and thickness on or under a base by means which permits it to be universally adjusted, longitudinally and transversely, whereby its optimum position may be arrived at, during which adjustment period the pads may, if desired, be covered by a cover element; and when the said adjustment has been attained, the pads may if desired be permanently fixed in their determined positions and a cover permanently fixed upon the base to enclose the pads therebetween.

Referring to the drawings, Figs. 1, 2 and 3, I have shown generally at 1 the base of the device which may be made of any suitable, preferably flexible, material such as leather, and at 2, 3 and 4, I have shown respectively a metatarsal pad, a longitudinal pad, and a heel pad, on the base, and at 5 a cover covering the pads and the base.

The pads may be made of any suitable material illustrative of which is rubber, as illustrated in some of the figures of the drawings, and sponge rubber, leather, etc., may be utilized.

In this form, the cover 5 is attached at its forward end to the forward end of the base by stitching or like means shown at 6—6 in order that its relative position on the base may be maintained, and in order that it may be hinged upwardly from the pads as shown in Fig. 3 to give access to the pads.

In this form, the pads are each provided with a band, of any suitable resilient material such as rubber, shown for the said pads respectively at 7, 8 and 9. The bands are preferably secured to the under side of the pad, and stretched sufficiently to telescope over the rear end of the base 1 and then allowed to contract to grip the base.

By this simple means, either of the pads may be shifted adjustably forwardly and rearwardly on the base 1 by sliding the band therealong, and may be shifted transversely of the base likewise.

In this form also the cover 5, when bent down into pad covering position may be detachably connected to the base 1 by a band 10 of rubber or other material, and this band may be seated in a groove 11 in the underside of the cover so as to leave the upper side of the cover smooth and unobstructed and conforming to the surfaces of the pads, and may be stretched to telescope it over the rearward end of the base and into the position shown in Fig. 2.

As indicated at 14 and 13 respectively, the bands 8 and 9 may be set in grooves in the undersides of the pads 3 and 4, so that the bands will not hold the pads away from the base 1, or distort their upper surfaces.

The pads 2 and 4 may in general lie within the confines of the base 1, but the longitudinal pad 3 may have to be adjusted transversely beyond the edge of the base as shown in Fig. 3, and to this end the band 8 may be secured in a groove 14 in the pad, see Fig. 4, and the pad may overhang the band so that while the band may grip the base the pad may overhang the base, when desired. It is obvious that the construction of the pad 3 and its band 8 is such that it may be used as a right or left.

The cover 5 may be wider than the base 1, see Fig. 5, and longer if desired and trimmed off when the arch support is fitted to conform to the adjusted profile of the pads and base, and to this end, the groove 11 on the cover may extend transversely beyond the limits of the band 10 as shown in Fig. 3. If preferred the cover may be made of a length and width to match the base and pads so that it would not be necessary to trim off any overhang of the cover.

Preferably all of the bands 7, 8 and 9 are disposed in grooves at 12, 14 and 13 in the pads so that the thickness of the band does not affect the surface contour of the pads, although the band may be made so thin that such grooves for this purpose are not necessary.

The cover 5 may be so thin that the groove 11 is preferably omitted and the band 10 may be so thin that the upper side of the cover remains practically smooth and unobstructed.

The cover 5 is preferably thin enough and flexible enough so that the weight of the body on the foot will cause the cover to conform to the surface contour of the pads and it may be of any suitable material such as leather, fabric or other flexible material.

In the modification of Fig. 6, the cover attaching band 10A is attached to the base 1 and looped over the cover 5.

In the modification of Fig. 7, a separate band 10B not attached to the base 1 or the cover 5 is slipped over the rear end of the device to hold the cover on.

Figure 9:
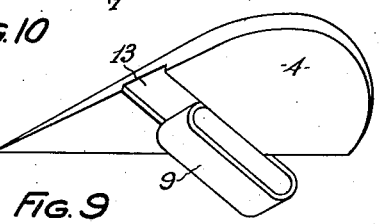
Fig. 9 is a view similar to Fig. 4, but illustrating a heel pad of Figs. 1, 2 and 3.

Fig. 9 shows the heel pad 4, and its band 9 in a groove 13 on the underside of the pad for the purposes described in connection with the longitudinal pad 3.

Fig. 10 shows that in some cases adjustment of the heel pad 4 may cause it to project beyond the base 1 and Fig. 8 shows that in some cases the cover 5 may project beyond the heel pad 4 and in either case the projecting parts may be trimmed off if necessary to conform to the wall of the shoe. Preferably the overhang of pad 4 in Fig. 10 may be trimmed along the dotted line 15A so that the lower edge of the pad conforms to the edge of the base 1.

Adjustment of pads, such as pads 3 and 4, beyond the edge of the base as described above and then trimming off any overhang not wanted produces smaller and better fitting pads in some cases.

Figure 11:
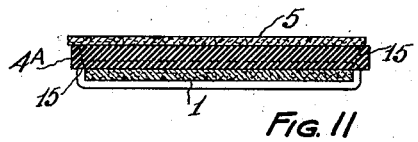
Figs. 10, 11 and 12 are views similar to Fig. 8, but illustrating modifications.

Fig. 11 shows a heel pad 4A extending entirely across the base and it may be trimmed if necessary along the dotted lines 15—15 together with the cover 5 to conform to the shoe.

Figure 12:
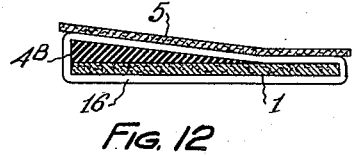

Fig. 12 illustrates a modification in which an unattached band 16 may be telescoped over a separate pad such as a heel pad 4B and over the base 1, under the cover 5.

Figure 13:
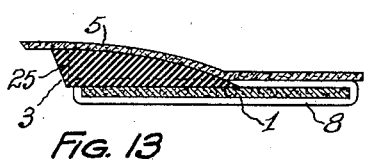
Fig. 13 is a cross-sectional view taken from the plane 13—13 of Figs. 1 and 2.

Fig. 13 illustrates how a cover 5 may overhang the longitudinal pad 3 and the overhang may be trimmed off as well as a part of the pad at any desired angle if necessary. If it be desired to change the shape of the pad so that it may be used above or below a base as will be hereinafter shown, the inner side of the pad may be trimmed off so as to be in a vertical plane as indicated by the dotted line 25.

Figure 14:
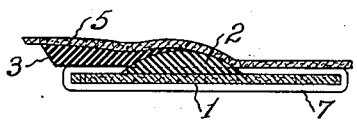
Fig. 14 is a cross-sectional view taken from the plane 14—14 of Figs. 1 and 2.

Fig. 14 shows how the longitudinal pad 3 may overlap a part of a metatarsal pad 2, as indicated in Fig. 3.

Figure 15:
Fig. 15 is a view illustrating a modified means for attaching the band element to the pad element which I may employ and different from the means shown in Figs. 4 and 9, and others of the preceding figures.
Figure 16:
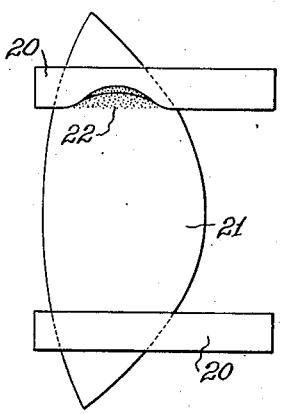
Fig. 16 is a view taken from the under side of Fig. 15 and illustrating a modified form of longitudinal pad element.

In the preceding figures the band and the pad may be formed separately and secured together, for example, by an adhesive, and in Fig. 15 is illustrated a pad, such for example, as a longitudinal pad 3A formed integral with its band 8A; Fig. 16 illustrating the pad and band of Fig. 15 as viewed from below. The pad 3A is a modification designed to be mounted on the under side of a base as will be hereinafter described, but as is apparent it may be constructed similar to Fig. 4 to be put on a base.

Figure 17:
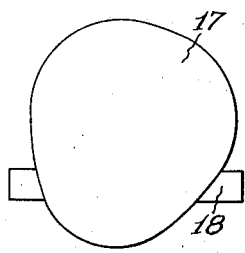
Fig. 17 is a top plan view illustrating separately a metatarsal pad such as that shown in Fig. 3.

Fig. 17 shows one form of a metatarsal pad 17 attached to a band 18 in a manner ready for use above a right base as is illustraed for the pad 2 in Fig. 3.

In some cases, the same construction of a longitudinal pad 3 and its band 8 may be made for either right or left.

Figure 18:
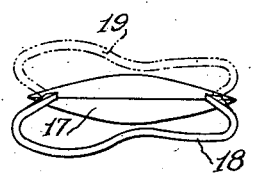
Fig. 18 is an end elevational view of the pad of Fig. 17 and illustrating a modification by which the band element of the pad may be shifted from one side to the other to render the pad left or right.

The metatarsal pad 2 and the heel pad 4 and some longitudinal pads, however, may be made interchangeable from right to left by the construction shown in Fig. 18. In this construction, the pad 17, as shown in Fig. 18, is made symmetrical on a transverse plane and the band 18 joins the pad at the plane of symmetry so that when it is used in the solid line position the pad is a right pad and when moved to the broken line position 19 and turned over becomes a left pad. When used in the broken line position not turned over it is also made usable below a right base as will hereinafter be described. In use the underside of the pad, when of rubber, or other resilient material, flattens out on a base and the upper side takes on a greater convexity.

Figure 19:
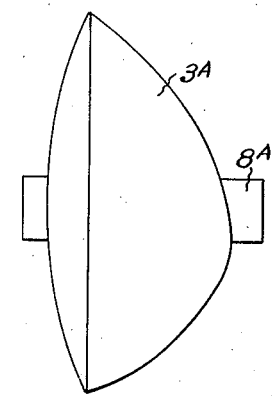
Fig. 19 is a view of a modification of a longitudinal pad and showing the use of two attaching bands and illustrating a modified means for attaching bands to a pad.

In some cases, it may be desirable to hold the relatively long longitudinal pad with two bands, and as shown in Fig. 19 two such bands 20—20 may be mounted on opposite ends of the longitudinal pad 21; and this view illustrates also that the bands may be secured to the pad by adhesive as at 22, and that the groove on a pad may be left off if preferred, and shows a modification in shape of a longitudinal pad.

Figure 20:
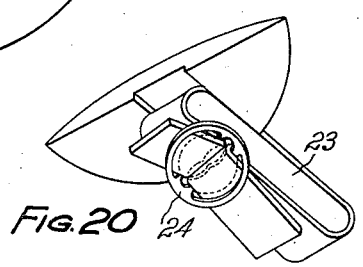
Fig. 20 is a view in general similar to Fig. 4, of the underside of a longitudinal pad and illustrating a modified form of band and means for adjusting the length of the band.

In Fig. 20 is illustrated a modification, in which the band 23, whether elastic as when made from rubber or not elastic as when made from leather or fabric or the like may be adjusted by means of a buckle device 24 to change its length to cause it to grip the base over which it is telescoped.

In the embodiments of my invention described above, the pads are mounted on an underlying base and covered by an overlying cover.

In Figs. 21 and 22 it is shown that the base 50 may have the pads 2, 3B and 51 mounted on the under side of the base, the base being made sufficiently flexible so that the weight of the body on the arch support will cause the base 50 to conform to the surface contour of the pads thereunder. If desired, a thin cover 26 may be placed on the upper side of the base 50, or a thin cover 27 on the underside of the pads, or in both places, and after the optimum corrective position of the pads is attained, may be secured thereon by adhesive or like material, to which adhesive further reference will hereinafter be made. The shape of the heel pad 51 differs from pad 4 in Fig. 9 in that the band 52 is on top of the pad. It is obvious that it may be a left pad turned over. The shape of pad 3B to which is attached the band 8B is different from pad 3 in Fig. 4 in that the inner side 25B of pad 3B is in the same vertical plane as indicated by the dotted line 25 in Fig. 13. It is apparent that such a pad as pad 3B may be turned over for use on a base, or may be used above or below a base as a right or left as the case may be. It is obvious that if preferred the side 25B of the pad 3B may be constructed in process of manufacture with its inner side in a vertical plane or at any desired angle, and that when a pad is used beneath a base the band that holds the pad to the base is on top of the pad. It is obvious that the band 7 of the metatarsal pad 2 as shown in Figs. 3 and 14 has been pulled through to the upper side of the pad, and that the metatarsal pad as used in Fig. 22 overlaps the longitudinal pad.

Any increased convex shape that may be assumed by the under side of resilient or spongy pads as shown in Fig. 22 due to being held under the base by their bands is eliminated in use by pressure of an individual's foot upon the completed arch support.

When only the metatarsal pad or the metatarsal and the longitudinal pads are to be used between the cover and base, the form of Fig. 23 may be employed in which a base 28 and a cover 29 are riveted or otherwise secured together at the heel end, as at 30. The forward ends of the cover and base may be separated, as shown at 29, and the bands of the pads slipped over the forward end of the base. A heel pad may be mounted upon the cover as is illustrated in Fig. 24, or a heel pad may be placed under the base as shown in Fig. 22 but with the cover 29 laid over the band.

In some cases it may be desired to permanently secure a base and cover together, as in Fig. 24, wherein the base 31 is permanently riveted to the cover 32 at both the forward and the rearward ends by rivets 33 and 34 and, prior to the riveting, the metatarsal pad 2 and the longitudinal pad 3 are mounted on the base by bands and thereafter may be adjusted longitudinally and transversely by bending the base to elevate the cover above it. In such cases, it may be desirable to mount the heel pad 4 on the upper side of the cover 32 by its band 9 as shown, embracing both the cover and the base, or the pad, such as pad 51 as shown in Fig. 22, may be under the base 31 with its band 52 around the base and permanently and adjustably between the cover and the base.

In the form of Fig. 25, the cover 35 is completely detachable from the base 36 being held thereon by a pair of bands 37 and 38.

In Figs. 27, 28, 29, 30, 31, 32, and 33 I have illustrated means by which after the pads have been adjusted by trial to their optimum positions, the pads, base, and cover may all be adhesively secured or cemented together into a unitary arch support.

A suitable cover for this purpose is shown in Fig. 27 and is of a type having two bands 37 and 38, such as those shown in Fig. 25 for attaching the cover to the base. The under side of the cover Fig. 27 is covered with a layer of cement or adhesive, covered and protected by so-called "face cloth," which as is well known may be peeled off leaving an adhesive or cement coated surface. The face cloth covering the adhesive on the cover is in pieces or sections as shown at 39 to 47, inclusive, any one of which pieces may be peeled off individually, and which may have any suitable shape and disposition for a purpose to be described. The pieces 43, 44, 45 and 46 are disposed adjacent to pieces 42 and 47 along a line 48 at one edge of the band 37, and similarly the pieces 42 and 41 are adjacent along a line 49 at the edge of the band 38 whereby these pieces may be peeled off without disturbing the band. The cover thus made is shown generally at 53. Inasmuch as the bands are not needed when ready to remove the face cloth for the purpose of cementing the covers onto the pads and base it is obvious that for this purpose, if preferred, the bands 37 and 38 may be attached to each end of the piece of face cloth 42 as denoted at lines 48 and 49 so that the face cloth together with the bands may be removed as is hereinafter illustrated and described in the case of a pad Fig. 34 or the band 37 may be attached to the pieces 43 and 45. The base shown generally at 54, in Fig. 28, has on its upper side adhesive similarly covered with face cloth or like material, in pieces 55 to 64, inclusive, which may have any suitable shape and disposition for a purpose to be described.

The face cloth is left on the cover and the base while the pads are being adjustably located, and the pads themselves may be covered on their upper and lower sides with adhesive covered by face cloth or other material, as shown at 65 and 66, Figs. 28 and 29, for a metatarsal pad 67, and the other pads may be similarly covered with face cloth protected adhesive or cement. To simplify the description the method will be described for the metatarsal pad 67 alone. After the pad 67 has been adjustably positioned by the band 68 in the manner described above, and with the cover 53 over the pad and over the base 54, the cover 53 is removed, and a pencil line 69, Fig. 28, is drawn around the pad upon the face cloth on the base 54, thereby indicating the position which the pad is to occupy. The pad is then removed from the base leaving the pencil outline thereon, see Figs. 30 and 31. The strip of face cloth 60 is disposed so that a part of it will underlie the determined position for this pad, and this piece 60 is now peeled off, as indicated in Figs. 30 and 31. The face cloth 66 on the underside of the pad 67, see Fig. 29, is now also peeled off as indicated in that figure and the band may be cut off close to the pad. The pad 67 is then replaced disposing it carefully within the outline 69 thereof, and the now exposed adhesive on the underside thereof is pressed upon the exposed adhesive surface 70 on the base, Fig. 31, and pressed firmly thereupon to adhesively attach it thereto.

The part of the pad 67 overlying the face cloth pieces 62 and 63 as shown in Fig. 31, is then lifted and these pieces 62 and 63 are peeled off and then the underside of the pad is pressed down cementing it to the base at these points also.

In a similar manner, the other pads may be cemented to the base after exposing adhesive by peeling off face cloth from the pads and after peeling off the face cloth strips 56, etc., from the base 54 and the other strips on the base and on the cover, such as the rear end pieces, 39 on the cover and 55 on the base. The face cloth on the upper sides of the pads such as the piece 65, Fig. 29, on the pad 67 are now peeled off, so that the entire underside of the cover 53 and the upper sides of the pads and the portions of the base 54 between and around the pads, are exposed adhesive surfaces, and the cover 53 is laid over the pads and over the base 54, and firmly pressed down and caused to adhere thereto, making a unitary arch support with the pads therein in their finally adjusted positions. Before cementing the pads and cover in place as described, the bands may be cut off or may be left on.

Fig. 33 illustrates, with bands cut off close to the pads and all face cloth removed, a side view of such an arch support. While in this and other illustrations of my invention showing side elevations of completed arch supports the sides or edges of the longitudinal and heel pads are not shown as covered, it is obvious that the construction may be such as to permit the covers to meet the bases so as to completely enclose the pads in a manner similar to that shown for the metatarsal pad 67, whether the covers are fastened on by adhesive or are detachable.

Fig. 32 illustrates an intermediate step in which the metatarsal pad 67 has been adhesively secured to the base 54, and before the other face cloth pieces have been peeled off.

Preferably the face cloth, 65 on the pads, such for example as the pad 67, extends only part way to the peripheral edge of the pad so that the pad will be more free to expand under pressure in use and while being adjusted.

Inasmuch as the bands are not needed after the pads are adjustably positioned, the same may be dispensed with at the time of making the final adjustment, and as shown in Fig. 34, for this purpose, the band 71 may be attached to the face cloth 72 on the pad 67A, so that after the pad is adjusted in position and a pencil line drawn around the pad upon the face cloth on the base to indicate the position the pad is to occupy, the face cloth together with the band 71 may be removed.

As stated hereinbefore, the pads may be mounted on the underside of the base, and Figs. 35, 36 and 37 illustrate the above described process with this variation. In Fig. 35 a metatarsal pad 17A as described in connection with Fig. 36 is adjustably attached by its band 18A to the underside of a base 54A upon which is face cloth over an adhesive cement. The base 54A may, if preferred, be a left base turned over, such as the mate to the right base 54 as shown in Fig. 28, and may be of any suitable material for such purpose.

Fig. 36 shows the use of face cloth 65A and 66A or like material over an adhesive or cement coating on a metatarsal pad 17A such as the pad 17 illustrated in Figs. 17 and 18, and which may therefore be used right or left, and above or below a base in a manner as is described for the pad shown in Fig. 18.

Fig. 37 illustrates an arch support made by the above described process with the pads under the base 54A, such as described above in connection with Figs. 21 and 22, the cover 53A being on the underside. The cover 53A may be a left cover turned over, such as the mate to the right cover 53 as shown in Fig. 27, or may be of any suitable material for use upon the sock lining or insole of an individual's shoe. The band 8C is shown cut off close to the longitudinal pad 3C leaving a smooth surface on the pad.

In the above description I have described my invention as embodied in the removable unitary insole type of arch support, with means by which the pads may be adjusted in position by trial, and means by which after they have been adjusted to their optimum positions, the pads may be fixed in that position between a cover and a base.

In Fig. 38, I have illustrated one manner in which an arch support embodying my invention may be built into a shoe, the wall of the shoe being broken away to illustrate the arch support therewithin. In this form, the above mentioned pads 2, 3B and 51 are mounted on the underside of a base 73 by their bands 7, 8B and 52, the base 73 being secured in the shoe by stitching at the forward part thereof as at 75—75, and the cover 74 being secured to the rearward part of the base or mounted on the base by a band 76. The pads by this arrangement may be adjusted in position longitudinally or transversely, and after being finally located may be fixed in position by adhesive, as described hereinbefore, or by securing the pads or their bands to the base by applying adhesive as described hereinafter.

A similar form is shown in Fig. 39, in which case, the base and the cover both are secured to the shoe by stitching 77 at the forward part of the base and cover. The pads 2, 3 and 4 are mounted upon the base by their bands 7, 8 and 9.

Fig. 40 illustrates the use of adhesive, preferably glue, as at 78, which when made moist secures a base 79 to the shoe as at 80, and adhesive, preferably rubber cement, on the approximating surfaces as shown at 81, 82 and 83 on the cover 84 and on the base 79 and on the pad 2 to secure the pad, such as the pad 2, to the base 79 and the cover 84 to the pad 2 and base 79 after the pad 2 has been adjustably positioned and its band cut off.

Figs. 41 and 42 illustrate a snap button type of attachment which may be used to secure a cover to a base, which base may be placed in a shoe or attached therein, as the case may be, for the purposes set forth in connection with Figs. 38 and 39; and Fig. 43 illustrates the use of tacks 86 to secure a base, such as at 87, to the shoe 88, a heel pad 85 being shown in adjusted position and as being cemented to the base. The base in front of the band of the heel pad 85 may be left free so that the pad bands would in such case be slipped on from the front end.

It is to be understood that in the forms described in connection with a shoe, that the bands may be cut off or removed as described hereinbefore after the adjustment and adhesive securing of the pads has been effected.

Fig. 44 illustrates the use of lacing indicated at 89 to join a cover 90 and a base 91 together. If this lacing is carried out all around the edge of the base, it may be applied after the pads have been adjusted, and after the bands, such as the band 52 as shown on the pad 51 illustrated in Figs. 22 and 38, have been placed in their final positions, or lacing may be used at one end or the other of the device and the other end secured to the shoe, as described above.

In Fig. 45, I have shown that the base 92 may be secured to the shoe at the heel end of the base, as shown by the stitching 93, in which case the forward end of the base would be free and the pad bands would be slipped on from the front end. In this form, a cover would be laid over the structure.

In Fig. 46, both a base 94 and a cover 95 are stitched to the rear or heel portion of the shoe, as shown at 96.

In Fig. 47 is shown a base 97 stitched to the shoe at 98—98 forwardly of the rear end of the base, to allow room for slipping the band of the heel pad over the rear end of the base and the bands of the other pads over the forward end of the base.

In Fig. 48 is a view of a form similar to that of Fig. 47, having intermediate stitching 100 at the outer side, and in this case, both the cover 99 and a base 97 are shown. The pads may be above the base or vice versa.

As shown in Fig. 49, a base 101 may be stitched at its forward portion to the shoe by stitching 102, and the rearward end may have snap buttons 103 for attaching it to the rearward part of the shoe. A cover may be used. And this view shows that the band, for example the band 104 of the metatarsal pad may be secured to the base by adhesive 105. Pencil lines as shown by the dot-dash lines on each side of the bands of the metatarsal and longitudinal pads mark the proper position of each pad for permanent attachment after adjustably determining it.

In Fig. 50 is shown a form comprising both a cover 106 and a base 107, the base being attached to the shoe by stitching at the forward portion, as at 108, and the rearward portion of the base being attached to the shoe by snap buttons 109. In this form the heel pad 4 is above the cover and the longitudinal and metatarsal pads are under the cover as illustrated by the longitudinal pad 3, and the forward end of the cover may be free and the rearward end attached by a band 110 to the base.

It is to be understood that the application of my improved arch support to a shoe may be made when the shoe is manufactured or that the arch support may be made separately and fastened in the shoe after the shoe has been made, and that if preferred any means of attaching the support to a shoe may be employed other than those described herein. When my arch support is fastened in a shoe in process of its manufacture the stitches or other such fastening means when employed are preferably not allowed to pass through the bottom or outside sole of the shoe, but preferably attach the support to the shoe parts immediately overlying the bottom sole of the shoe whether such parts are permanently attached to the bottom sole or not.

In the following will be described a number of modifications of the means for attaching pads adjustably to a base and for affixing them in adjusted position whether the same are used in separate removable arch supports or whether they are embodied in the structure of a shoe.

Fig. 51 illustrates a rear portion of a base 111 and a heel pad 112 provided with a band 113 by which its position has been adjustably determined, and adhesive 114 on the pad, and at 115 on the base, affix the pad in its adjusted position whether the pad is above or below the base.

In Fig. 52 is illustrated a base 116 upon which a heel leveler 117 is mounted by a band 118 and upon which heel leveler is a spur protector 119 mounted upon the base by a band 120. In such a case, if preferred, the spur protector may be of sponge rubber or like yieldable material, while the heel leveler may be of the same or more solid material.

In Fig. 53, I have shown a heel pad 121, having a band 122, as hereinbefore described, and another band 123, attached to the heel pad and the band 122. Both of the bands may be looped over the base and the band 123 will prevent longitudinal shifting forwardly of the heel pad while the band 122 will permit a transverse adjustment thereof. Band 123 may be of a resilient material such as rubber or may be of a non-resilient material such as cloth and may if preferred be seated in a groove in the pad, such as the grooves hereinbefore referred to.

In Fig. 54 is illustrated a base 124 viewed from below, with pads, for example, a longitudinal pad 125, on the top side thereof, and a cover 126. The bands 127, 128, 129 and 130, illustrative of bands attached to the pads and cover, have been adjusted longitudinally of the base 124 to the adjusted positions of the pads and cover, and pencil marks such as 131 and 132 on opposite sides of the band 130, for example, have been marked on the base to determine the position of the band, and then the edge of the band is raised as shown at 133 and 134 for the bands 128 and 127, and adhesive such as rubber cement applied thereto and to the base thereunder, as at 135 and 136, and the bands are then adhesively secured to the base. This locates the pads and cover in the positions to which they have been adjusted, but permits some motion of the pads with the foot action upon the support in use, inasmuch as that part of the band on the upper side of the base is not attached thereto by adhesive.

In Fig. 55 is illustrated a step of a process corresponding to that more fully described in connection with Figs. 27 and 28, using face cloth, and showing how the attaching of the band to the base, described for Fig. 54, may be practiced with face cloth.

Across the underside of a band, say the band 128, is a piece of face cloth, as at 137, and horizontally across the base itself is a piece of face cloth, for example 138, and the pencil marks to locate the adjusted position of the pad are made on the base and face cloth, for example at 139, on either side of the determined band position, after which the pieces of face cloth on the band and on the base may be peeled off and the band secured to the base by adhesion. Until the face cloth is peeled off the band will move freely over the base during adjustment.

Fig. 56 illustrates an optional means for attaching a pair of bands such as the bands 140—140 to a pad such as the longitudinal pad 141, the bands being provided with slits 142 through which the opposite end portions of the pad are inserted.

Fig. 57 is a cross sectional view through an arch support embodying my invention and comprising a base 143, a pad not attached to a band such as a heel pad 144, and a cover 145, and showing a separate band 146 having a loop portion 147 extending under the base and one loop portion 148 looped over the pad and base and another loop portion, integral therewith, 149 looped over the cover to hold the three parts together.

In Fig. 58 is illustrated a modification of the idea illustrated in Fig. 57. Here the base 150 has a band 151 looped around under the base 150, and a body portion 152 over the base and the band comprising a lateral loop 153 looped around the heel pad 154 which is not attached to a band. In this instance, the cover 155 is laid upon the upper loop 153 and secured to the base by its own loop or other attaching means hereinbefore described. This form permits the heel pad 154 to overlap the base 150 laterally as has been referred to.

In Fig. 59, is illustrated another construction of band for attaching a pad, such as a longitudinal pad 156 to a base. The band comprises two loops 157—157 embracing opposite ends of the pad 156, connected by a connector element 158, and at each end of the pad there is a loop 159 for embracing the cover, and loops 160—160 for embracing the base, and as shown, the loops may be discontinuous and after embracing their corresponding parts of the structure as stated may be made into an embracing loop by connecting the free end, such as the end 161, to the body of the loop by adhesive, and if preferred the loops may be formed beforehand ready for use as described.

Fig. 60, illustrates a modification of the form of Fig. 59. Here the pad, such as a longitudinal pad 162, has longitudinal band elements 163 and 164 on both sides thereof, and at the ends of the longitudinal elements are loops 165—165 embracing the pad, and loops 166—166 for embracing the base.

In Fig. 61, a pad such as a longitudinal pad 167, is illustrated and the band is in the form of a sleeve 168, having slits 169 through which the ends of the pad are inserted and the sleeve 168 may be telescoped over the base, and may be provided with lateral slits 170—170, to facilitate gripping of the base by the sleeve.

Figure 62:
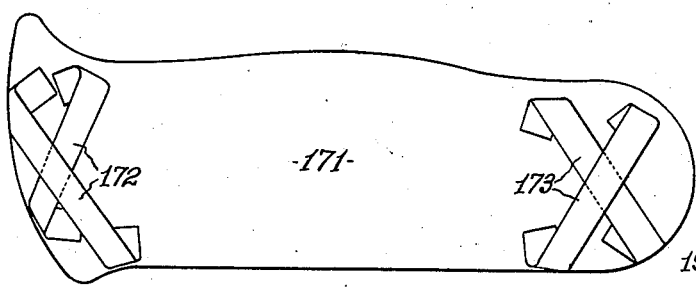
Figure 65:
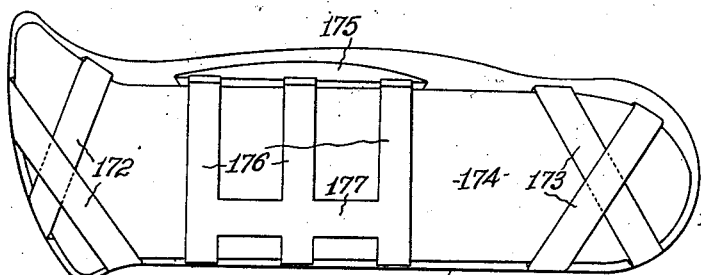

In Figs. 62 and 65, I have illustrated a modified means for attaching a cover to a base. As shown in Fig. 62, the cover 171 has crossed bands 172—172 and 173—173, secured on opposite end portions thereof, providing in effect, end pockets, and as shown in Fig. 65, the base 174 at its opposite ends is inserted into said pockets. A pad, such as a longitudinal pad 175, is shown attached to the base by a plurality of bands 176, joined by a longitudinal band 177.

Figure 63:
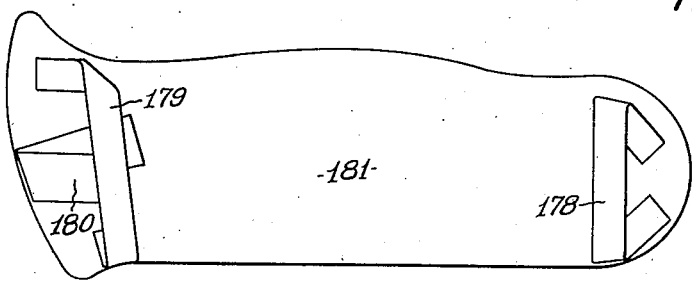
Figure 66:
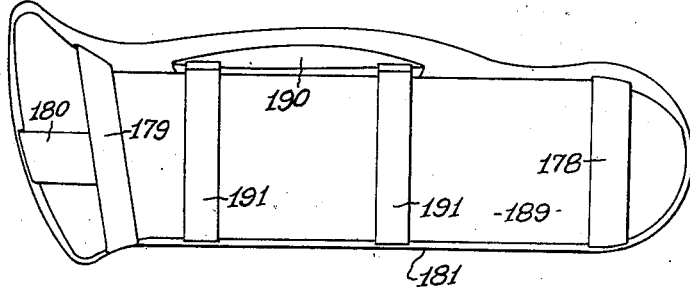

In Figs. 63 and 66 is illustrated a modification of the form of Figs. 62 and 65, in which, as shown in Fig. 63, single bands 178 and 179 are provided at each end of the cover, the band 179 having a longitudinally extending loop 180 secured thereto and to the cover, the cover being shown generally at 181. The loop of band 180 may be of resilient material such as rubber or non-resilient material such as cloth and may if preferred be seated in a groove in the cover such as has hereinbefore been described. In Fig. 66, the base 189 is shown attached to such a cover, the opposite ends of the base projecting into the loops or pockets provided by the bands 178 to 180. A longitudinal pad 190 is shown attached to the base by a pair of bands 191.

Figure 64:
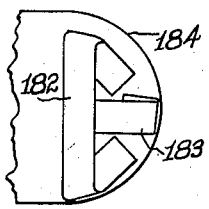

Fig. 64 illustrates a modification in which the rearward end of the cover 184 has bands 182 and 183 similar to those on the forward end of the cover 181 of Fig. 63. The means here illustrated may if desired be the only means provided at one end on a cover, such as the cover 184, for attaching a cover to a base or, if desired, may be used at both ends of a cover or when suitable in conjunction with any other fastening means hereinbefore illustrated. When used at the rearward end of a cover that is used on a base, such as for example the base 73 in Fig. 38, such a modification prevents the cover from being pushed forward by the foot of the individual.

Figure 67:
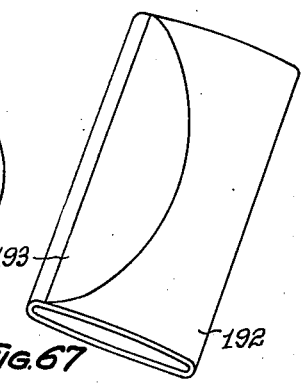

Fig. 67 illustrates a type of band 192 which may be used for a pad, such as the longitudinal pad 193, particularly when the pad is small. The pad is secured directly to the band.

Figure 68:
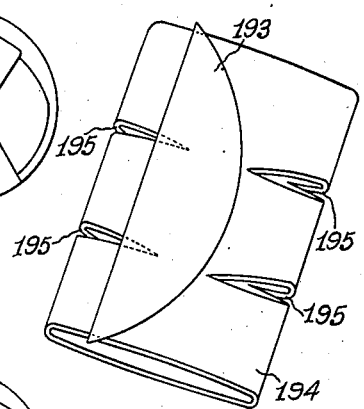

In Fig. 68 is illustrated a modification of the form of Fig. 67 in which the band or sleeve, in this case 194, is provided with lateral slits 195—195 to facilitate gripping of the sleeve or band upon the base.

Figs. 69 and 70 illustrate a modification which may be used when face cloth is employed as described hereinbefore. A pad 199 is secured to the face cloth shown at 196 which is mounted on a band 200, by snap buttons comprising male portions 197 in the face cloth and female portions 198 in the band. After the pad on the band has been adjustably fitted on a base such as shown in Fig. 28 the face cloth and band is removed from the pad and base, and the pad secured to the base by means of exposed adhesive surfaces.

Fig. 71 illustrates a metatarsal pad 201 having a band 202 slitted at lateral portions 203—203 to cause it to embrace the base more securely. This view also illustrates a form of metatarsal pad attached to a band symmetrically in a vertical plane for use under either a right or a left foot without turning the pad over and without pulling the band through.

In Fig. 72, a longitudinal pad 204 is shown with another form of slitted band. In this case, two bands are employed, each having a relatively wide portion 205, which may go under the base and separate portions 206—206, to go over the base, and to be secured to the pad 204; and the lateral portions of the band where they embrace the base being slit as at 207—207 to facilitate their gripping of the base.

In Fig. 73 is illustrated a form in which the pad, such as a metatarsal pad 208, is disposed in a pocket 209 and the pocket and the pad therein are universally adjustable as a unit upon a base. The pocket, which may be made of leather, fabric or other material, comprises an upper portion 210 and a lower portion 211 stitched together as at 212 or otherwise fastened together and closed at its periphery but open at one end. At the open end, the upper and lower layers of the pocket are secured respectively to upper and lower branches 213 and 214 of a slit band 215, the part of the band which goes around and embraces the base being shown as broken off. The pad 208 is inserted into the open end of the pocket shown at 216, through and between the branches of the band and lodged in the pocket and may be adjusted on the base by moving the pocket and the band 215 on the base.

In Fig. 74 is illustrated a pocket 217 made of superimposed pieces and with a band 220 therebetween, secured together by stitching 219, and enclosing a metatarsal pad 218 in the pocket, the part of the band which goes around the base being shown as broken off. If preferred the pad 218 may be attached to the band 220 or to the pocket by stitching or other means.

In Fig. 75 is illustrated a modification in which a single band 221 may be used to attach two pads, for example both a metatarsal pad 222 and a longitudinal pad 223, to a base.

The metatarsal pad 222 is attached to a leather or like longitudinally extending supplemental base (or cover) 224 by adhesive or the like as shown. Rearwardly of the pad 222 the supplemental base is provided with slits 225 and the intermediate portion of the band 221 is projected through the slits. The supplemental base 224 and the pad 222 may thus be adjusted longitudinally or transversely with respect to the band 221 and the band 221 and its pad 223 may likewise be adjusted longitudinally or transversely. The band 221 may be secured to the pad 223 by adhesive as shown at 226, or the pad formed integral with the band, and an unattached portion 227 may be provided whereby the pad 223 may project laterally beyond the adjacent slit 225. It is to be understood that an unattached portion such as 227 of the pad 223 may be provided on any of the longitudinal pads or other pads hereinbefore illustrated.

Fig. 76 shows a modification in which a pad such as a metatarsal pad 228 is attached to a supplemental base (or cover) 229 by adhesive or the like as shown and the band 230 to embrace the base is secured to the supplemental base 229. In use the supplemental base 229 may be used as a cover and overlie the pad 228. If preferred the band 230 may be attached to the pad 228 as is illustrated in Fig. 77, or to both the pad and the base.

In Fig. 77 is illustrated a form similar to that of Fig. 76, but in this case, a heel pad 231 is secured to a supplemental base (or cover) 232, and the band 233 is secured to the pad 231. Here again the pad 231, when the band 233 embraces the base, may lie under the supplemental base 232.

In Figs. 76 and 77 the supplemental bases 229 and 232 may serve as covers for the pads of these figures and for metatarsal and heel pads and their modifications as described elsewhere herein.

Fig. 78 is a side view of a pad such as that shown in Fig. 77, but illustrating a modification. The heel pad 234 has a cover 235 secured thereto and the pad is mounted on the base 236 by the band 237 and face cloth 238 upon adhesive may be used to permanently secure the pad to the base in its finally adjusted position. If preferred the band 237 may be attached to the face cloth on the pad 234.

In Fig. 79, I have shown a band 239 attached to a pad 240, such as a longitudinal pad, in which form the band is not a closed band but has free ends 241 and 242. The band 239 may be secured in any suitable manner to the pad 240, but as shown, is formed integral therewith.

The ends 241 and 242 of the band are provided with adhesive material upon which may be face cloth 243 to be peeled off and the ends of the band may be wrapped around the base and the ends adhesively secured together. This band may be made of resilient or non-resilient material. It is obvious that the face cloth may be left off and adhesive cement applied to the ends 241 and 242 for the purpose of securing the ends of the bands together.

In Fig. 83 I have shown a modification of means for attaching a pad band 244 to a base 245, the end portion of the band being secured to a clip device 246 which clampingly slides over and grips the edge of the base 245.

In Fig. 84 I have shown one use of the attachment means of Fig. 83. Here a pad such as a metatarsal pad 247 is mounted between two layers of leather, fabric or the like 248, stitched together or otherwise secured together, and having a wing portion 249 provided with a pair of slits 250 through which the band 244 is projected. Clip devices 246 are provided at the opposite ends of the band 244, and arranged to grip opposite edges of a base, and the wing 249, and therefore the pad 247, may be adjusted laterally of the band, or transversely of the base, and the clip devices 246—246 may be slid along and adjustably moved along the edges of the base longitudinally.

In Fig. 88 is illustrated a modification of the idea embodied in the clip device of Figs. 83 and 84. Here the clip devices 251 embracing opposite edges of the base 252 are provided with a series of holes through which the opposite ends of a band 253 are woven in and out to cause the band to grip the clip devices, but to permit the band to be adjusted through the clip devices transversely of the base 252 in a manner that will be apparent. The pad 254 is attached to the band and as it moves, both longitudinal and transverse adjustment is provided.

In Fig. 87 is shown a modification in which a pad such as a longitudinal pad 255 is secured to a supplemental base or cover 256, for example by adhesive at 257, and a pair of bands 258—258 are projected through pairs of slits 259—259. The bands 258 may embrace a base or opposite end portions of the bands may be secured to clips 246 such as those shown in Fig. 83 for longitudinal adjustment and the pad may be adjusted along the bands for transverse adjustment. In Fig. 87 the supplemental base 256 may serve as a cover for pads of this figure and for longitudinal pads and their modifications as described elsewhere herein.

It is obvious that in all cases where clip devices are used, covers for single pads or covers for a plurality of pads, may be employed and large enough, if preferred, to cover the clips and thick enough to afford any needed protection to the individual's foot.

In Figs. 80 and 81 is shown a modification of a pad construction. Here a pocket is formed comprising upper and lower pocket walls 260 and 261, the pocket being open at one side as shown and a band 262 secured to the pocket embraces the base 263. One or more pads 264 are placed in the pocket and adjustably movable therewith. The pads may be of leather as illustrated or of rubber or any desirable material.

In Fig. 86, the device of Figs. 80 and 81 is shown but with face cloth at 265 on the underside of the pocket and on the upper side of the base 263 which may be removed after the pocket and pads 264 have been adjustably located to expose adhesive and cause the pocket to adhere in position upon the base, the process involved thereby having been discussed above. It is apparent that, if preferred, the band 262 may be attached to the face cloth on the lower pocket wall 261.

In Fig. 82, a modification of Fig. 80 has been shown in which a pocket structure is provided comprising a lower pocket wall 266 and a succession of upper pocket walls 267 to 270 providing a plurality of pockets 271 to 274, into which pockets pads may be inserted, and the lower pocket wall 266 may be mounted on a base 275 by bands 276 and 277 for transverse and longitudinal adjustment of all of the pockets concurrently, and the thickness of the pocket walls may be relatively small so that when a single pad is used in one of the pockets, the entire thickness of the structure will be small but may be increased by putting other pads in the other pockets.

In Fig. 85 is shown a modification of the embodiment of Fig. 82. Here the pockets are arranged with the smaller pocket on the bottom, the view being a view from the under side of the assembly and the pads, shown collectively at 278, are shown projecting out of the pocket. The lowermost pocket has slits at 279 through which a pair of band elements 280 are projected having, on their opposite ends, clip devices 246 such as those shown in Fig. 83. These clip devices will grip the opposite edges of the base and may be moved longitudinally therealong and the assembly of pockets may be moved along the band elements 280 thereby giving the said universal adjustment.

In Fig. 89 is illustrated another construction by which my invention may be applied to a shoe. A base 281 which may be an insole of the shoe is secured thereto, for example by stitching, at 282, leaving an outer unattached part 283. A pad such as a longitudinal pad 284 has a pair of band elements 285—285 secured to the pad and the free ends thereof are woven through perforations in a metal clip 286 hooked over the free edge portion 283. The opposite ends of the band elements may be secured to clips 287—287 similar to clip 290, or if preferred the pad may be secured to clip devices similar to 246 such as is shown in side elevation in Fig. 83 and may be provided to embrace the opposite free edge portions of the base.

A heel pad such as the pad 288 may similarly be provided with clips 289 and 290, clip 289 being similar to clip 290 or if preferred similar to clip 246 in Fig. 83, by which a strap 291 will hold it on the base. By adjusting the straps relative to the clips, as described for Fig. 88, the pads may be adjusted transversely and by sliding the clips along the free edge portions of the base they may be adjusted longitudinally. When clip devices similar to 246 are secured to the pads as described above longitudinal movement only of the pads is provided for.

In Fig. 90 is shown the construction of the underside of a base 292 and of a cover 293 that may be provided stitched to the base by stitching shown at 294. When the stitching at the end of the base is extended as indicated by the broken lines 295 a heel pad similar to 288 Fig. 89 may be placed on the under side of the base instead of on the base as is shown. Any excess overlapping part of the cover may be trimmed off. At 286, 287, 289 and 290 is illustrated the under side of the clips shown in Fig. 89. It is to be understood that all pads hereinbefore described with clip devices may be used above or below a base.

In Fig. 91 is shown a modification in which a pad, such as a longitudinal pad 296, has loops 297—297 formed in the body of the pad, and through and under the loops a band element 298 is projected. The band element is preferably on the underside of the pad and may be a continuous loop for embracing a base or may have free ends to be jointed together by adhesive or the like, as described for the loop of Fig. 79 and illustrated therein or the free ends may be used in connection with clips as illustrated in Figs. 83 and 88.

In Fig. 92 is a modification similar to Fig. 91 except that a pocket of leather, fabric, or the like, 299, comprises upper and lower pocket walls 300 and 301 joined by stitching at 302, but leaving the forward portion 303 unstitched to provide an entrance to the pocket, and pads may be inserted in the pocket through the entrance. One wall 300 of the pocket is provided with loops 304—304 through which a band element 305 may be inserted as described in connection with Fig. 91.

In Fig. 93 is shown a pocket comprising a pocket wall piece 306 having a pocket end wall 307 and a pocket strap wall 308, secured to the pocket wall 306 by stitching or the like. A pad, such as a metatarsal pad 309 may be slipped into the pocket thus formed. A band element 310 may be secured, for example by adhesive at 311, to the pocket 306 and may be a complete loop or have free joinable ends as described hereinbefore. This structure is viewed from the underside in Fig. 93. If preferred the band 310 may be attached to the end of the pad 309 that is shown overlapping it instead of to the pocket 306.

Fig. 94 shows a pad such as metatarsal pad 312 having a device 313 preferably of metal provided with prongs 314 which may be projected into the material of the pad leaving a slide way in which a band element 315 may be slidably mounted.

Fig. 95 illustrates a pad, such as a metatarsal pad 316, having a band element 317, slidable transversely through the pad. The slidability may be provided by making the pad in two portions 318 and 319 cemented together, as indicated, but leaving an uncemented channel through which the band element is projected, or a channel may be made through the pad in process of manufacture.

Fig. 96 is a modification similar in general to Fig. 94, but in this form a device 320, attached to the pad by prongs 321 projected thereinto, has a pair of slots 322 separated by a bar 323, through which a band element 324 is projected.

In Fig. 97 is shown a form in which a pad such as a metatarsal pad 325 is secured upon a leather or like cover (or supplemental base) 326 for example, by adhesive at 327, and a device 328 preferably of metal, in general similar to that shown in Fig. 96 is provided but having two prongs 329 projected into or originally moulded into the material of the pad, the band element being shown at 330 and slidable through the device 328.

In the modification shown in Fig. 98, a pad such as a longitudinal pad 331, has face cloth 332 thereon. A buckle device 333 preferably of thin metal, has prongs or fingers 334 secured to the face cloth in any suitable manner for example by being tied or stitched thereto by thread 335. The ends 336 and 337 of the band element may be drawn through the buckle to the desired tension around a base or the like, and the band embracing the base may be adjusted longitudinally thereon, and for transverse adjustments, the ends of the band projecting through the buckle device 333, may be adjustably slid therein, or the band may be slid around the base. When the pad is in the finally adjusted position, the face cloth 332, together with the buckle device 333 and the band, may be removed and discarded, and the pad in its adjusted position may be adhesively secured to a base such as illustrated in Fig. 28 by the adhesive shown at 338 on the pad.

In the above modifications, Figs. 91 to 98, inclusive, as in the case of some of the other modifications described above, the band may be in the form of a continuous loop to embrace the base; or it may be in a form having free ends and the free ends may be stuck together by adhesive or joined by a buckle device or may have clips thereon to embrace the edges of the base; and when the bands are not dependent upon their resiliency to embrace the base or to clampingly grip the edges of the base, they may be made of cloth or leather or other material if preferred to a resilient material as will be understood.

In the forms heretofore described, when a cover is used on a base, it has been attached thereto by stitching or by adhesive, or by a band, etc. In Fig. 99 showing the under side of a cover is illustrated another means of attaching a cover 342 to a base. The cover is provided with clip devices 339 secured thereto having tongues 340 which may overlap the edge of the base and either be bent so as to engage the base between the cover and the tongue or the tongue may be made resilient to embrace the edge of the base.

Fig. 100 is a fragmentary view taken in the direction of the arrow 100 of Fig. 99 showing the cover 342 upon a base 341, the cover having the clip devices 339 and with the tongues 340 gripping the edge portion of the base 341. Obviously clip devices such as 339 may be used on both lateral portions of the cover to embrace both lateral edges of the base providing they are placed where the pads cannot interfere with their use.

In a general review of the numerous embodiments and modifications of my invention in the foregoing it will be apparent that I have provided an arch support, the pads or elevated portions of which may be universally adjusted in relation to the wearer's foot; and have provided means by which when the pads have been adjusted to their optimum positions, whether a single pad or a plurality of pads, they may be fixed in that position upon a base or cover or like body; and pads adjustably attached to a base or cover or body in a number of ways, including bands attached to the pads and resiliently embracing the base, bands with respect to which the pad is adjustable; bands not of complete loop form but of free end form the ends attached to each other or attached by various means to a base or cover or body and adjustable relative to the pad; an attaching band and pad constructed so that the pad may overlap the base or cover or the like to which the band is attached; adjustable pads which may be used under or over the base and with or without a cover; pads which may have their own individual covers or a cover covering a plurality of pads; constructions of arch support which may be used as individual supports interchangeable with different shoes, or which may be built into a shoe; and individual pads not only adjustable on a base but interchangeable with other pads of different sizes and shapes. Obviously my invention may be practiced with all sizes of base, cover and pads, and right or left, and with commercial pads, to which bands are subsequently attached to adapt them to my invention; and that any materials may be used by which the principles of my invention as described may be practiced. In the terminology of the claims the pad is sometimes referred to as mounted on a "base", and the band as embracing the "base"; and the word "base" in such claims is intended to be of generic definition and to be inclusive of the base or the cover or other structural element of the arch support, or the arch support as a whole upon which the pad is mounted.

In Figs. 101 to 103, inclusive, is illustrated what may be called a fitting device having a mode of operation correlative with that of the above described arch support itself. In general, the fitting device comprises a piece of paper or other sheet material 351, having indicia printed thereon, in general of the width of the base of an arch support embodying my invention, and at the rearward end thereof having a tail piece 352.

The main body 351 of the device has a transverse scale 353 thereon in inches preferably, a number of longitudinal lines 346, numbered transversely as at 347, and a number of transverse lines 348 designated by letters, which in the embodiment illustrated are capital letters, the first line at letter A preferably being a little heavier than the other transverse lines, and in the forward part of the device are a number of curved transverse lines 349, designated by a longitudinal series of numbers respectively.

In Figs. 101 to 103 this device is illustrated in connection with an arch support comprising a base 1, having a cover 5 of the type that is, as described hereinbefore, attached to the forward end of the base by stitching 6—6. Metatarsal, longitudinal and heel pads are shown at 2, 3 and 4.

The preferred manner of using the said fitting device is as follows:

The device is laid flat upon a smooth surface, such as a floor, and will be made initially of a width wider than the individual foot to be fitted and of a length longer than from heel to ball of the foot, and preferably of sufficient size to determine any width and size of arch support base that may be required. The individual places his foot on the device while sitting down with the outer side of his foot aligned with the outer edge, the upper edge as viewed in the drawings, Fig. 101 of the device, and the foot is shifted longitudinally thereon until his heel is at a predetermined position, determined by bending the tail piece 352 upwardly at right angles to the floor at a dot or point 350 marked thereon.

A record of his instep (longitudinal arch) is now made on the chart with a pencil. The pencil may be held perpendicularly and pushed lightly against the inner side of the foot and an outline thereby made on the chart extending back to the tail piece 352. The intersection of this line with the scale 353 is the approximate width of the arch support needed for the individual case being charted and if desired the chart may be cut off to this width.

A comparative outline is now made of the longitudinal arch of the individual's foot while standing and then he removes his foot from the chart. The width of the desired base for the individual case is then more exactly determined by first folding the tail piece 352 under the chart and placing the chart in the individual's shoe with the outer edge thereof fitted against the outer edge of his shoe insole, or against the external side of the shoe, and with the mark 350 fitted against the rear wall or heel of the shoe, and the scale is marked to determine the internal edge of the shoe insole or the inner side of the shoe, and then the device is cut off accurately along this more exact line or is folded under therealong.

Calipers may be now used to measure the distance from the back of the individual's heel to the front edge of the cavity in the sole of his foot just behind his metatarsal heads. This distance is then marked on the chart from the central dot 350 and this mark will denote the proper area for the front end of the metatarsal pad. The number just beyond this mark denotes the approximate size of the arch support base required and the excess length on the chart may be cut or torn off across the chart on the curved line at this number. In Fig. 101, this size of the arch support base is six.

The fitting device is now placed upon a base, such as has been described heretofore, and various types, sizes and shapes of pads are adjusted in position and tried until the proper size and shape of pads and positions thereof are determined.

When the pads have thus been selected, they are outlined in their proper positions on the chart and the stock number of the pad is placed within the outline for each pad which indicates the number of the pad.

When this method is followed, the indicated size of arch support, base and pads may be ordered by number from a manufacturer or distributor as needed and as indicated by the chart.

Thus the chart may be used to determine the size in general of the arch support, the length and width of the base, the optimum location of any number of pads thereon after they have been positioned by universal adjustment as described, and the chart may be preserved as a record from which other pads, bases, etc. may be ordered from a manufacturer or distributor of stock sizes, and a succession of records on charts may be made as treatment proceeds to show the progress of the case.

When the chart is being used to locate by trial the optimum positions of the pads and the sizes and shapes thereof, the chart may be secured to the base as shown in Figs. 102 and 103 by inserting the tail piece 352 under one or more of the bands on the underside of the base, for example the bands 7, 8, and 9 of the pads and/or the band 10 which in the form illustrated holds the cover on the base in a manner described hereinbefore, and to facilitate making a record of the experimental as well as the final quantities of the arch support, it may be provided with any system of longitudinal and transverse lines and indicia therefor, one system of which has been shown in Fig. 101.

The opposite side of the device from that which has indicia printed thereon and either side of the tail piece 352 may have instructions or other matter printed thereon.

The fitting device is shown on a base for a right foot, but may be used for a left foot by trimming off enough of that part of the left or lower side of the main body 351 of the device, as viewed in Fig. 101, so as to make its edge similar in shape to the right or upper edge of the main body 351. This allows the front end of the device to be passed forward between the cover and base without interference from the stitches 6—6; or indicia as illustrated may be printed on both sides of the device and the device used for both a right and a left foot; or the device as illustrated in Figs. 101 and 103 may be made in rights and lefts, the construction of the left being apparent by the illustrations of the device for the right foot.

Having illustrated and described numerous modifications of embodiments of the principles of my invention, it will be apparent that these principles may be embodied in other modifications and my invention is inclusive in its scope of all such modifications; and changes and modifications may be made in the embodiments illustrated and described without departing from the spirit of my invention and without sacrificing its advantages.

For example, while I have illustrated and described the use of adhesive for securing parts of the arch support together after the pad or pads have been adjusted to their optimum positions, and the adhesive material being covered by face cloth or like covering material during the adjustment or trial and error period, it is to be understood that the adhesive need not be on the parts during the adjustment period but that it may be in the form of cement or the like applied with a brush or other instrument upon the parts to be adhesively secured together after the optimum position of the pad or pads has been determined.

I claim:

1. A pad device for arch supports comprising a pad element, and a closed loop band element associated therewith for longitudinally telescoping over and embracing the opposite lateral edges of an arch support base element to adjustably mount the pad element on the base element.

2. A pad device for arch supports comprising a pad element and a closed loop band element supporting the pad element and adapted to constrictingly embrace spaced apart edge portions on an arch support base element and being slidable on said edge portions for universal adjustment of the pad element on the base element.

3. A pad device for arch supports comprising a pad element and a closed loop band element associated therewith for longitudinally telescoping over and embracing the opposite lateral edges of an arch support base to adjustably mount the pad element on the base, and the closed loop of the band being of adjustable length.

4. In an arch support, a base element having adhesive material thereon, a cover on the adhesive material, a pad element supported by a closed loop band encircling and frictionally embracing the base element by which it may be universally adjustably positioned thereon to an optimum position, the cover being removable to expose the adhesive material for securing the pad element to the base element in its adjusted optimum position.

5. In an arch support, a base element, a pad element, a strap element associated with the pad element and having free end portions, clip devices slidably embracing opposite portions of the base element, and the free end portions of the strap element being adjustably connected to the clip devices respectively.

6. In an arch support pad device, a pad element, the pad element slidably connected to an intermediate portion of a strap element, the opposite free ends of the strap element having clip devices secured thereto adapted to slidingly grip opposite edge portions of an arch support base.

7. In an arch support pad device, a pad element, a layer of face cloth or the like thereon, a band element secured to the face cloth and adapted to be adjustably mounted on an arch support base to adjustably position the pad element on the base, the face cloth and the band element being removable from the pad element whereby it may be adhesively attached to the base in adjusted position.

8. A pad construction for arch supports comprising a pocket element, and a pad in the pocket element, and means to attach the pad to an arch support base element permitting universal longitudinal and transverse adjustment thereof on the base element, comprising a band connected to the pocket and embracing the base element.

9. A pad for an arch support comprising a pad element, a recess in the pad element, and a band element disposed in the recess for embracing an arch support base.

10. A pad for an arch support comprising a pad, a recess in the pad for receiving a band element adapted to embrace an arch support base.

11. In an arch support a base of sheet material, a pad on the base having a band associated therewith for telescoping over and embracing the opposite lateral edges of the base whereby the pad may be universally adjusted longitudinally and transversely on the base to find the optimum position thereof, and the pad being secured against shifting by adhesive in the previously determined optimum position.

12. In an arch support, a base element, a pad having a band associated therewith and embracing the base element for universal adjustment of the pad to determine the optimum position thereof, at least a portion of the surface of the pad having adhesive thereon covered by covering material which renders the adhesive non-adhesive, during adjustment of the pad, and the band being removable from the pad upon removing the covering material, whereby after the optimum position of the pad has been determined, the covering material and the band may be removed and the pad and cover may be adhesively secured together with the pad in the said optimum position.

13. In an arch support, a base element, a pad having a band associated therewith and embracing the base element for universal adjustment of the pad to determine the optimum position thereof, adhesive material on the band and on the base and covering material on the adhesive to render it non-adhesive whereby when the optimum position of the pad is determined, the covering material may be removed and the band and the base adhesively secured together to secure the pad in the determined optimum position.

14. In an arch support, a base, a pad having a band associated therewith and constrictingly embracing spaced apart edge portions on the base to attach the pad to the base, the band being manually slidable on the said edge portions for universal adjustment of the pad on the base, and a cover mounted on the base by means permitting it to be temporarily manually displaced relative thereto to facilitate adjusting the pad.

15. In an arch support, a base, a pad having a band associated therewith and constrictingly embracing spaced apart edge portions on the base to attach the pad to the base, the band being manually slidable on the said edge portions, and the pad being slidably associated with the band for univeral adjustment of the pad on the base, and a cover mounted on the base by means permitting it to be temporarily manually displaced relative thereto to facilitate adjusting the pad.

16. In an arch support, a base, a pad having a band associated therewith and constrictingly embracing spaced apart edge portions on the base to attach the pad to the base, the band being manually slidable on the said edge portions for universal adjustment of the pad on the base.

17. In an arch support, a base, a pad having a band associated therewith and constrictingly embracing spaced apart edge portions on the base to attach the pad to the base, the band being manually slidable on the said edge portions, and the pad being slidably associated with the band for universal adjustment of the pad on the base.

18. A pad device for arch supports comprising a pad element and a closed loop band element supporting the pad element and adapted to constrictingly embrace spaced apart edge portions on an arch support base element, and the band being slidable on said edge portions and the pad being slidably supported by the band element for universal adjustment of the pad element on the base element.

19. In an arch support, a base element, a pad element and a strap element associated therewith and having free end portions and clip devices at the free end portions, the clip devices slidably embracing spaced apart edge portions on the base element and the free end portions being adjustably connected to the clip devices for universal adjustment of the pad element on the base element, and a cover mounted on the base element by means permitting it to be temporarily manually displaced relative thereto to facilitate adjustment of the pad element.

20. In an arch support, a base element, a pad element and a strap element associated therewith and having free end portions and clip devices at the free end portions, the clip devices slidably embracing spaced apart edge portions on the base element and the pad being slidably mounted on the strap element for universal adjustment of the pad element on the base element, and a cover mounted on the base element by means permitting it to be temporarily manually displaced relative thereto to facilitate adjustment of the pad element.

21. In an arch support pad device, a pad element, a strap element supporting the pad element at an intermediate portion thereof, the opposite free end portions being provided with clip devices adapted to grip spaced apart edge portions of a base element to mount the pad thereon.

22. In an arch support pad device, a pad element, a strap element slidingly supporting the pad element at an intermediate portion thereof, the opposite free end portions of the strap element being provided with clip devices adapted to slidingly embrace opposite edge portions of a base element to adjustably mount the pad thereon.

23. In an arch support pad device, a strap element supporting the pad element at an intermediate portion thereof, the opposite free end portions of the strap element being provided with means slidably engageable with spaced apart edge portions of a base element to adjustably mount the pad thereon.

24. In an arch support, a base, a pocket, a pad in the pocket, the pocket having a band associated therewith and constrictingly embracing spaced apart edge portions on the base to mount the pad on the base, the band being manually slidable on said edge portions for universal adjustment of the pad and pocket on the base.

25. In an arch support, a base, a pocket, a pad in the pocket, the pocket having a band associated therewith and constrictingly embracing spaced apart edge portions on the base to mount the pad on the base, the band being manually slidable on the said edge portions and the pocket being slidably associated with the band for universal adjustment of the pad and pocket on the base.

26. A pad device for arch supports comprising a pocket element, a pad element in the pocket element, and a closed loop band element supporting the pocket element and adapted to constrictingly embrace spaced apart edge portions on an arch support base element and being slidable on said edge portions for universal adjustment of the pad element on the base element.

27. A pad device for arch supports comprising a pocket element, a pad element in the pocket element, a closed loop band element supporting the pocket element and adapted to constrictingly embrace spaced apart edge portions on an arch support base element, and the band being slidable on said edge portions and the pocket being slidably supported by the band element for universal adjustment of the pad element on the base element.

28. A pad device for arch supports comprising a pocket element, a pad element in the pocket element, and a closed loop band element associated with the pocket element for embracing an arch support base element to adjustably mount the pad element on the base element.

29. In an arch support pad device, a pocket element, a pad element in the pocket element, a strap element supporting the pocket element at its intermediate portion and the opposite free end portions of the strap element being provided with means slidably engageable with spaced apart edge portions of a base element to adjustably mount the pad element on the base element.

30. In an arch support pad device, a pocket element, a pad element in the pocket element, a strap element supporting the pocket element at its intermediate portion, the opposite free end portions of the strap element being provided with clip devices adapted to slidingly embrace spaced apart edge portions of a base element and the pocket element being adjustable toward and from the clip devices.

31. An arch support, comprising a base having spaced apart lateral edge portions, an attachment element comprising a portion on the base between said edge portions and having means associated therewith frictionally engaging the spaced apart edge portions, and the said attachment element portion being thereby attached to the base and rendered manually slidably adjustable on the base, in the direction of the said edge portions, a pad element associated with the said attachment element portion for movement therewith to adjust its position on the base, and a cover element mounted on the base by means permitting it to be temporarily manually displaced relative thereto to facilitate adjusting of the pad element.

32. An arch support comprising a longitudinally elongated base of sheet material having spaced apart lateral edges, an attachment element comprising a portion lying on the base and between said edges and having means associated therewith frictionally engaging the said edges, the said attachment element portion being thereby attached to the base and rendered manually slidably adjustable longitudinally of the base, a pad element associated with said attachment element portion for movement therewith to adjust its position on the base, and a cover mounted on the base by means permitting it to be temporarily manually displaced relative thereto to facilitate adjusting of the pad element.

33. An arch support, comprising a base having spaced apart lateral edge portions, an attachment element comprising a portion on the base between said edge portions and having means associated therewith frictionally engaging the spaced apart edge portions, and the said attachment element portion being thereby attached to the base and rendered manually, slidably adjustable on the base, in the direction of the said edge portions, a pad associated with the said attachment element portion for movement therewith to adjust its position on the base.

34. An arch support comprising a longitudinally elongated base of sheet material having spaced apart lateral edges, an attachment element comprising a portion lying on the base and between said edges and having means associated therewith frictionally engaging the said edges, the said attachment element portion being thereby attached to the base and rendered manually slidably adjustable longitudinally of the base, a pad associated with said attachment element portion for movement therewith to adjust its position on the base.

35. An arch support comprising a base having spaced apart lateral edge portions, a closed loop band constrictingly embracing the base and frictionally engaging the edge portions and being thereby attached to the base and rendered manually slidably adjustable along the base, a pad associated with the band so as to move therewith to adjust its position on the base.

36. An arch support comprising a base having spaced apart lateral edge portions, a closed loop band constrictingly embracing the base and frictionally engaging the edge portions and being thereby attached to the base and rendered manually slidably adjustable on the base longitudinally and transversely, a pad associated with the band so as to move therewith, to adjust the position of the pad universally on the base.

37. In an arch support, a base, a pad having a band associated therewith and constrictingly embracing spaced apart edge portions on the base to attach the pad to the base, the band being manually slidable on the said edge portions for adjustment of the pad on the base, and the band being formed from a strip of material the two ends of which are joined by means permitting adjustment of the circumferential length of the band.

38. In an arch support, a base, a pad having a band associated therewith and constrictingly embracing spaced apart edge portions on the base to attach the pad to the base, the band being manually slidable on the said edge portions for adjustment of the pad on the base, and the band being formed from a strip of material the two ends of which are joined by a buckle-like device permitting adjustment of the circumferential length of the band.

39. A pad device for arch supports comprising a pad element and a closed loop band element supporting the pad element and adapted to constrictingly embrace spaced apart edge portions on an arch support base element and being slidable on said edge portions for adjustment of the pad element on the base element and the band element being formed from a strip of material the two ends of which are joined by means permitting adjustment of the circumferential length of the band element.

40. A pad device for arch supports comprising a pad element and a closed loop band element supporting the pad element and adapted to constrictingly embrace spaced apart edge portions on an arch support base element and being slidable on said edge portions for adjustment of the pad element on the base element and the band element being formed from a strip of material the two ends of which are joined by a buckle-like device permitting adjustment of the circumferential length of the band element.

JOHN D. BAUM.